United States Patent
Kashefy

(10) Patent No.: US 6,211,780 B1
(45) Date of Patent: Apr. 3, 2001

(54) DYNAMIC TRAFFIC LIGHT

(76) Inventor: Hamid R Kashefy, P.O. Box 554, Station Place Du Parc, Montreal (CA), H2W 2P1

( * ) Notice: Subject to any disclaimer, the term of this patent is extended or adjusted under 35 U.S.C. 154(b) by 0 days.

(21) Appl. No.: 08/718,380

(22) PCT Filed: Jan. 23, 1996

(86) PCT No.: PCT/CA96/00046

§ 371 Date: Oct. 23, 1998

§ 102(e) Date: Oct. 23, 1998

(87) PCT Pub. No.: WO97/27079

PCT Pub. Date: Jul. 31, 1997

(51) Int. Cl.$^7$ ............................................. B60Q 1/54
(52) U.S. Cl. .................... 340/466; 340/467; 340/479; 340/463; 340/464; 340/468
(58) Field of Search .................... 340/466, 467, 340/479, 463, 464, 468, 471, 472, 476, 477, 478

(56) References Cited

U.S. PATENT DOCUMENTS

| | | | | |
|---|---|---|---|---|
| 3,794,972 | * | 2/1974 | Van Ostrom | 340/479 |
| 3,829,828 | * | 8/1974 | Hutchinson | 340/466 |
| 4,034,338 | * | 7/1977 | Bevilacqua | 340/467 |
| 4,059,824 | * | 11/1977 | Tanimura | 340/467 |
| 4,272,800 | * | 6/1981 | Asatourian | 340/467 |
| 4,326,415 | * | 4/1982 | Lee | 73/499 |
| 4,772,868 | * | 9/1988 | Chen | 340/479 |
| 4,802,437 | * | 2/1989 | Felicetti | 116/62.4 |
| 4,841,276 | * | 6/1989 | Abel et al. | 340/466 |
| 4,894,640 | * | 1/1990 | Beasley et al. | 340/464 |
| 4,916,431 | * | 4/1990 | Gearey | 340/479 |
| 5,148,147 | * | 9/1992 | Kobres | 340/464 |
| 5,164,701 | * | 11/1992 | Nan-Mu et al. | 340/464 |
| 5,594,415 | * | 1/1997 | Ishikawa et al. | 340/467 |
| 5,770,998 | * | 6/1998 | Choi et al. | 340/463 |
| 5,818,332 | * | 10/1998 | Chen | 340/441 |
| 5,856,992 | * | 10/1998 | McNeill | 340/441 |

* cited by examiner

*Primary Examiner*—Nina Tong

(57) ABSTRACT

A vehicle signaling display device to be mounted on an automotive vehicle, so that signaling lights of the device are visible for drivers of following vehicles, includes orange or amber, red and green lights and includes a system specifically designed to count speed sensor pulses for measuring speed of any vehicle of any make and model on which the device is installed, for controlling the signaling lights in accordance with the speed of the vehicle and regardless of operation and position of accelerator pedal of the vehicle, in order to perform a set of standardized operations of the signaling lights for dynamically preventing traffic crashes. The device (a) turns on a distinct arrangement of a number of lights of the signaling lights for indicating different ranges of the speed of the vehicle so that a red light of the signaling lights remains lit without flashing regardless of braking as advanced stop sign indicating very low speed or stationary state of the vehicle, orange lights of the signaling lights remain lit indicating low speed of the vehicle and green lights remain lit indicating forward motion with constant speed; (b) flashes orange lights whenever the speed of the vehicle is reduced by a standardized value without braking; (c) flashes red lights whenever the speed of the vehicle is reduced by the standardized value by braking; (d) flashes green lights to indicate acceleration by the standardized value; so that as the rate of deceleration increases, the red or orange lights flash faster.

26 Claims, 9 Drawing Sheets

= GREEN

= ORANGE

= RED

LO = ORANGE LIGHT   LG = GREEN LIGHT   LR = RED LIGHT

DYNAMIC TRAFFIC LIGHT

BACKGROUND OF THE INVENTION

This invention is a colour coded rear lighting system for motor vehicles.

DISCUSSION OF THE RELATED ART

There are prior art which try to indicate the rate of the deceleration of a vehicle without relying on mechanical deceleration detectors [U.S. Pat. No. 5,481,243 and GE Pat. No. DE 4236395 A1]. One of the outstanding features of the present invention is that it measures speed of vehicle on which it is installed by internationally standardized unit (eg. km/h) and flashes a light when speed of the vehicle is varied by a standardized speed difference.

SUMMARY OF THE INVENTION

Dynamic Traffic Light takes the place of centre high mounted stop lamps on motor vehicles, since the brake lighting system presently used on vehicles is too primitive and too static.

It is primitive because it has a single and simple function which does not precisely reflect the changes of speed of leading vehicles. If leading driver simply reduces pressing the gas pedal and does not brake at all, speed of his/her vehicle drops. In many cases this decrease in speed has significant consequences but it is not informed to following drivers by any light. Therefore, the brake lighting system currently used in vehicles is not informative enough to following drivers and it is not sufficiently appropriate for a goal so important as to prevent traffic crashes.

The brake lighting system which is used at the present time on motor vehicles is static because though it signifies deceleration when driver applies brake, it does not indicate to following drivers how fast the speed of a leading vehicle is reduced. For example, if a car is travelling at certain speed, whether the driver of this car just touches the brake pedal or he/she presses the brake pedal rigorously for swift deceleration, a red light is simply turned on. If leading car is stopped or it has low speed, and its driver is not pressing the brake pedal, there is no indication from a distance to following driver (who may have high speed) that the leading car is actually stopped or it has low speed, unless following vehicle advances perilously closer to leading one. If leading car is stopped with its brake lights on, from a fairly far distance it is not immediately evident to following drivers whether the leading car is stopped or it is in motion. In the latter case, there is no indication about the range of speed of leading car. So following drivers should approach the leading car more and then react.

"Lave (1987) ran a number of cross-section regressions on state data.

In this invention orange, red and green lights are used to dynamically coordinate the variation of speed of vehicles by providing highway information. At every moment, Dynamic Traffic Light of leading cars help following drivers who just look at the leading cars (on all lanes) from a distance, to realize:

a) Whether leading cars travel with a constant speed or they are accelerating or decelerating b) If leading cars are accelerating or decelerating, how fast the speed of these cars is changed.

c) The range of speed of leading cars.

More precisely, Dynamic Traffic Light performs 12 well-defined functions. In order to explain them, I first define the following:

i) One unit of speed=a standardized speed difference or other words, a selected multiple of the internationally standardized unit (eg. km/h). The unit of speed for the operation of Dynamic Traffic Light is selected to be 1 km/h for the occurrence of the first flash of the orange and red lights. The unit of speed is selected to be 3 km/h for the occurrence of the subsequent flashes of the orange and red lights as well as for the occurrence of the flashes of the green light(s).

ii) Reference speed=Speed at which a flashing of any light occurs iii) First flash=Flash of orange or red light which occurs after 1 km/h or more is reduced from reference speed.

iv) Constant speed=[Mathematically], speed whose domain is:
(reference speed−1 km/h, reference speed+3 km/h) so that constant speed can fluctuate in the mentioned domain, and yet no flashing occurs.

v) Last flash=Flashing of any light after which speed becomes constant.

The frequency at which green, red or orange lights flash help following drivers to immediately perceive how fast the speed of a leading car increases and more importantly, how fast the speed of a leading car decreases. Consequently, following drivers can react more appropriately to the alterations of speed of leading car.

It seems that when unit of speed is chosen to be 3 km/h, 10 flashes per second is reasonable as maximum rate of flashing by any light of Dynamic Traffic Light. For example, if a leading driver brakes so hard to reduce the speed of his/her car 30 km/h or more per second, then 10 flashes per second of red light is fast enough to reflect drastic deceleration of leading car.

If speed X km/h is increased by Y km/h, so that the Y km/h is less than one unit of speed, green light LG3 does not flash as it is supposed to, since (X+Y) km/h is still considered as constant speed. If speed (X+Y) km/h is reduced by one unit, red or orange lamps do not flash, because flashing occurs only if one unit of speed is added to or reduced from reference speed. So, in the above example, speed should be first diminished by Y km/h and then it should be further reduced by one unit to cause the first flash of orange or red lights to happen. But the first flash of orange light in particular, is the most important to reduce the reaction time of following drivers. Thus Dynamic Traffic Light is designed so that the first flash of red or orange lights occur as soon as reference speed is reduced by 1 km/h.

This assures that the first flash of orange or red lights occur after one unit or less decrease in constant speed. The subsequent flashes of red or orange light occur after at least one unit of speed is reduced from negative reference speed (speed at which a flash of red or orange occurred and continues to decelerate).

An extreme case with the functions of Dynamic Traffic Light is when a car equipped with such traffic light loses traction and its tires spin faster than the actual speed of car. This situation is common when a car is accelerated from rest position on snow or ice. The result is false flashes of green light since these flashes are supposed to reflect increase in speed of car. In order to prevent such incorrect flashes, Dynamic Traffic Light is designed so that when speed that is lower than 32 km/h increases, green light does not flash. But if this low speed is reduced, orange or red lights flash. Evidently, false flashes of green light never occur with cars equipped with a traction control system.

Accidents occur when speed variations happen. Flashes of Dynamic Traffic Light arise when reference speed is changed at least by one unit. The first flash of orange or red light can be set to occur when reference speed is reduced by 1 km/h or other words, when speed is reduced by 1 km/h or more.

BRIEF DESCRIPTION OF THE DRAWINGS

In drawings which illustrate the electronic circuits and wiring of lamps needed to implement the Dynamic Traffic Light.

DETAILED DESCRIPTION OF THE INVENTION

Figure 1:
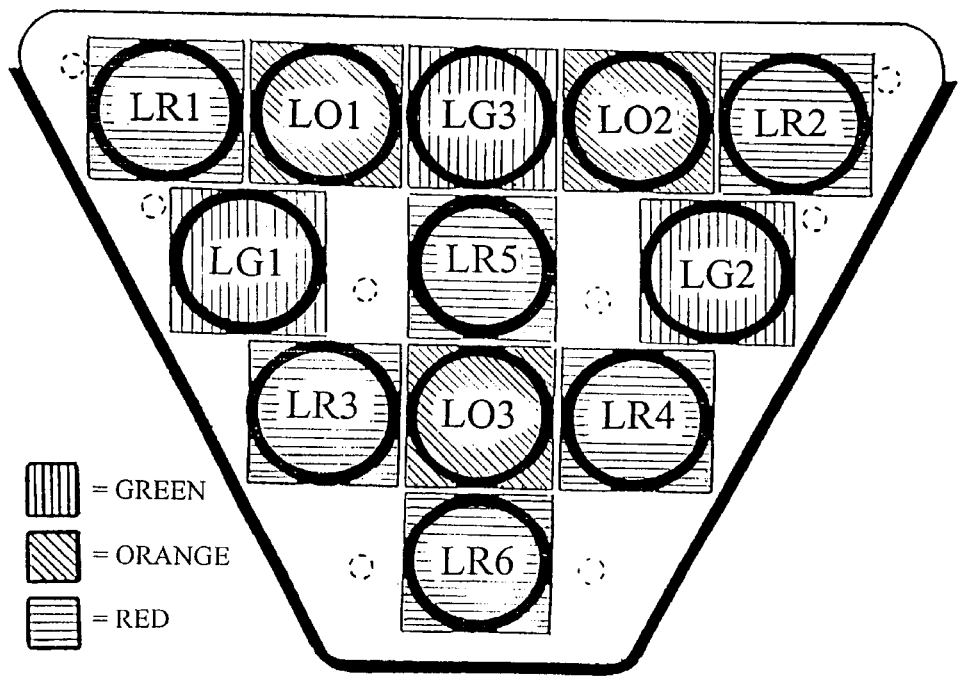
FIG. 1 illustrates front view of one of many possible configurations of lights of Dynamic Traffic Light and the numbering of lights for later references in this description.

FIG. 1 illustrates front view of one of many possible configurations of the lights of Dynamic Traffic Light and the numbering of lights for later references in this description.

Figure 2:
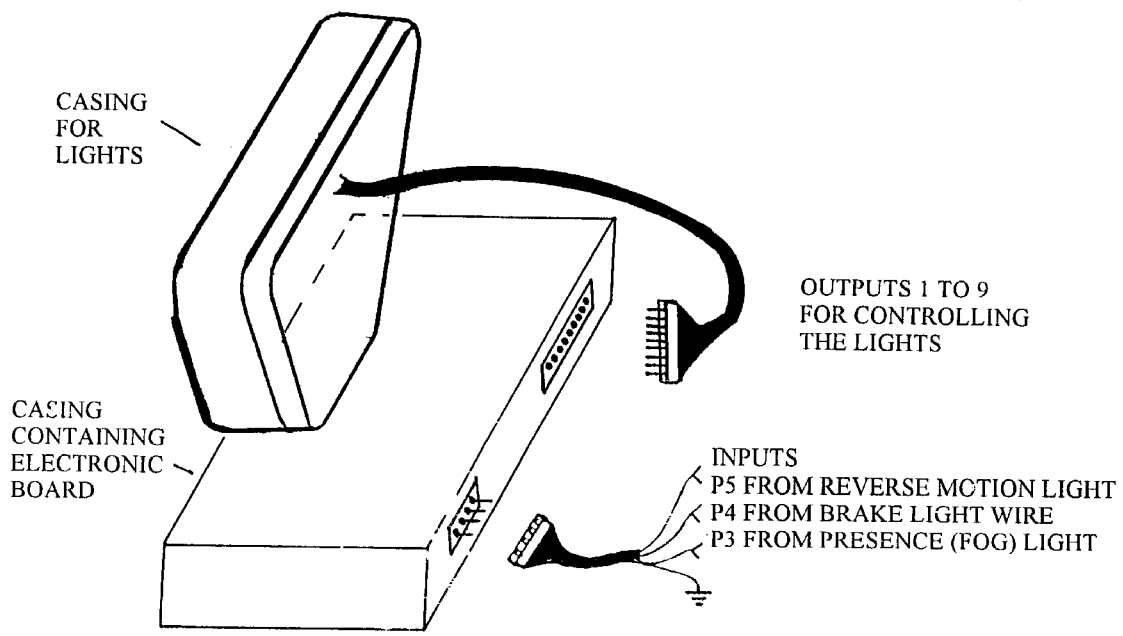
FIG. 2 illustrates an overall view of this invention.

FIG. 2 illustrates an overall view of this invention. A multiconductor containing 4 wires connects rear fog light wire, brake light wire, reverse motion light wire, and a ground wire to input P3, P4 and P5 of Dynamic Traffic Light by 4 pin connectors. A multiconductor containing 9 wires delivers 8 outputs of the relays and a grounded wire from Dynamic Traffic Light to the lamps casing, by using 9 pin connectors.

Figure 3:
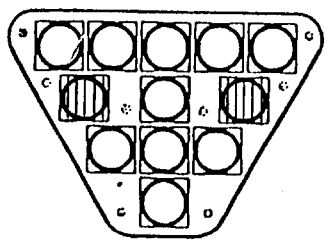
FIGS. 3, 4, 5, 6, 7, 8, 9, 10, 11, 12 and 13 depict functions of the lights of Dynamic Traffic Light.

FIG. 3 shows that if the speed of the vehicle is over 31 km/h and under 96 km/h, green lights LG1 and LG2 stay on to inform following drivers that leading vehicle has constant speed in the mentioned limits.

Figure 4:
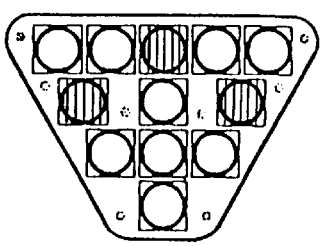

FIG. 4 shows that if the speed of the vehicle increases, green light LG3 flashes on momentarily at least per each unit increase in the speed of the vehicle while the green lights LG1 and LG2 remain on.

Figure 5:
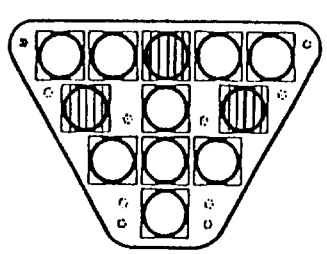

FIG. 5 shows that if the speed of the vehicle increases to 96 km/h or more and less than 128 km/h, the green light LG3 turns on and remain on as the green lights LG1 and LG2 are left on to inform the following drivers from a distance, that the leading vehicle has constant speed in the mentioned range. If the constant speed increases, then green light LG3 flashes off, at least per each unit increase in the speed of the vehicle.

Figure 6:
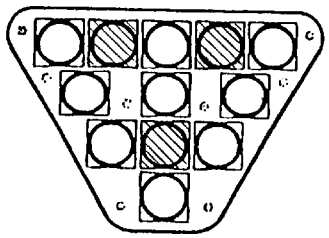

FIG. 6 shows that if any speed, that is greater than 31 km/h, is reduced without applying brake on the vehicle, orange lights LO1, LO2 and LO3 momentarily flash on while all of the green lights which are on flash off, per every unit decrease in the speed of the vehicle.

Figure 7:
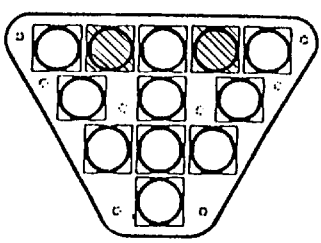

FIG. 7 shows that if the speed of the vehicle is reduced to 31 km/h or less and the brake pedal is not pressed, the orange lights LO1 and LO2 stay on (while every other light is turned off) to indicate the low speed of the leading vehicle to the following drivers.

Figure 8:
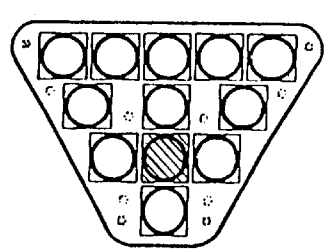

FIG. 8 together with FIG. 7 shows that if the vehicle with the low speed decelerates, then the orange lights (LO1, LO2 in FIG. 7) LO3 in FIG. 8 flash off and on interchangeably, per every unit decrease in the speed of the vehicle.

Figure 9:
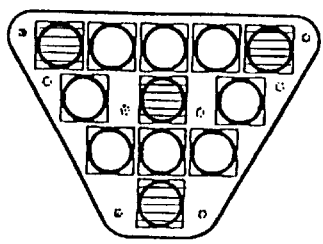

FIG. 9 shows that if the speed of the vehicle is reduced to less than 8 km/h (or if the vehicle is stopped) while driver is pressing the brake pedal, then red lights LR1, LR2, LR5 and LR6 turn on and remain on in the shape of a downward triangle to indicate total stop of the vehicle. Also as a result of this function, if at any speed, a driver has to brake intensely to totally block wheels of his/her vehicle while his/her vehicle is still in motion, then the red lights LR1, LR2, LR5 and LR6 glow as explained. Said red light LR5 also glows when the speed of the vehicle is under 8 km/h and the brake is not being applied on the vehicle as shown in FIG. 12.

Figure 10:
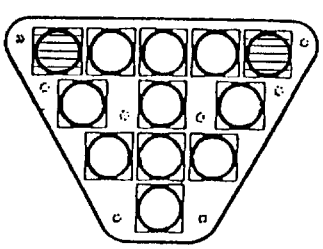

FIG. 10 shows that if the speed of the vehicle is greater than 7 km/h and the brake is applied on the vehicle, the red lights LR1, LR2 immediately turn on.

Figure 11:
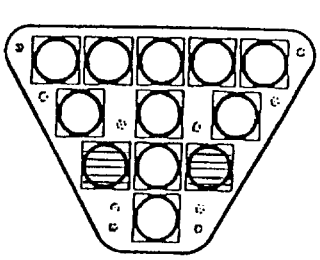

FIGS. 11 and 10 show that if the speed of the vehicle is greater than 7 km/h and the brake is applied on the vehicle, per every unit decrease in the speed, red lights (LR3, LR4 in FIG. 11) and the red lights (LR1, LR2 in FIG. 10) flash on and off interchangeably. So that the faster the speed is reduced, the faster the red lights flash, and the brighter the red light LR6 glows.

Figure 12:
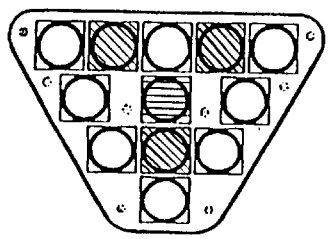

FIG. 12 shows that if the speed of the vehicle is reduced to less than 8 km/h and driver of the vehicle is not pressing the brake pedal, the same red light LR5 of the FIG. 9 and the orange light LO3 automatically turns on and stays on while the orange lights LO1, LO2 remain on. As a result of this function and the above function described for FIG. 9, when the speed of the vehicle is less than 8 km/h, whether the driver of the vehicle applies the brake on his/her vehicle or not, the red light LR5 remains on to indicate the very low speed or stationary state of the vehicle. Or to indicate that at any speed a driver totally blocked wheels of his/her vehicle.

Figure 13:
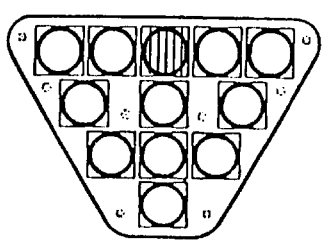

FIG. 13 shows that if the speed of the vehicle is increased to 128 km/h or more, the green lights LG1 and LG2 turn off and only the green light LG3 remains on to inform the following drivers that the speed of the leading vehicle is constant at 128 km/h or higher. If this constant speed increases, the green light LG3 and (LG1, LG2) flash off and on interchangeably, per every unit increase in the speed FIG. 3 and FIG. 13. Orange and green lights do not turn on any more as long as the vehicle is set for reverse motion.

Figure 14:
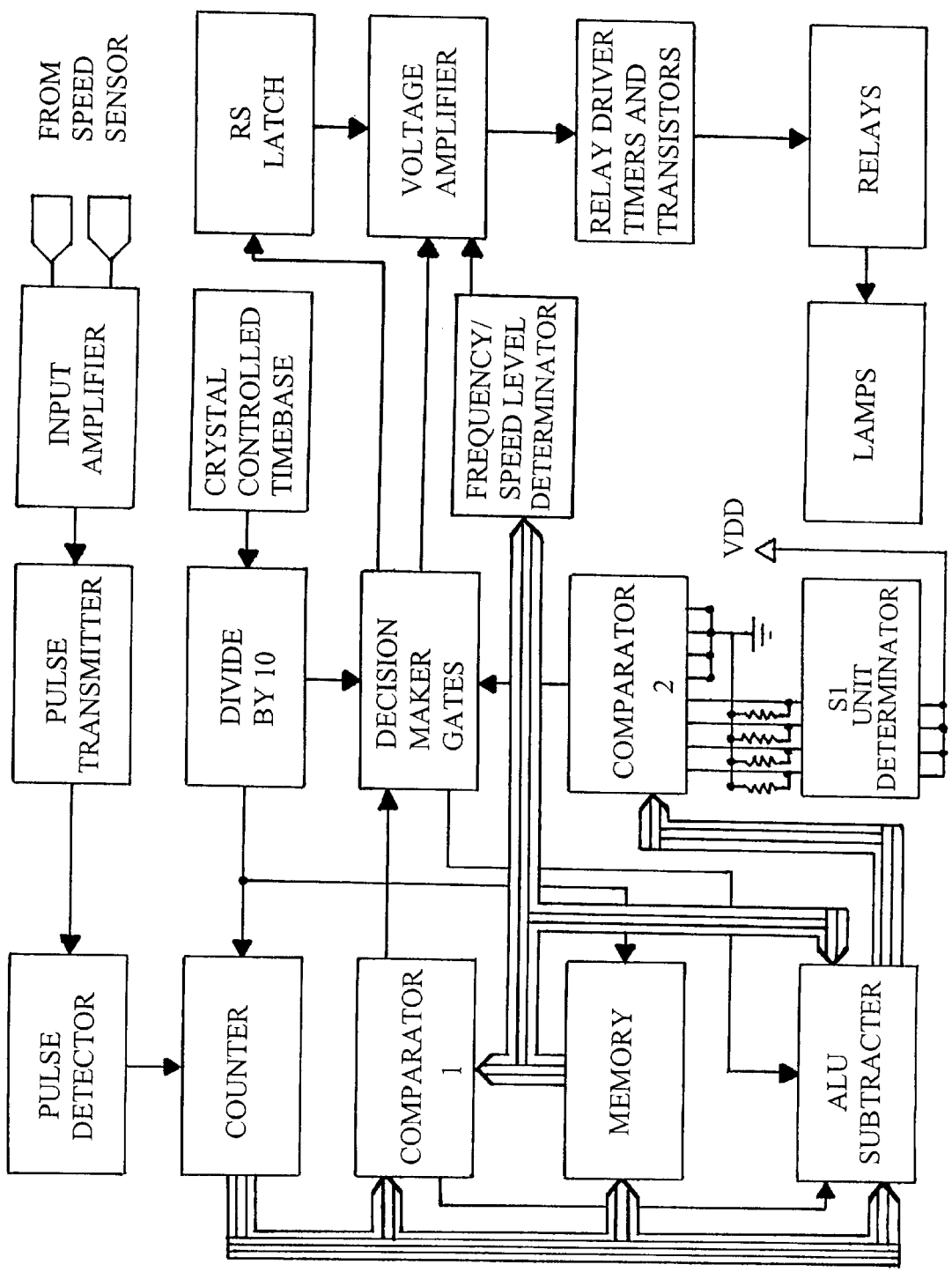
FIG. 14 illustrates a block diagram of this invention.

FIG. 14 illustrates a block diagram of present invention. Dynamic Traffic Light operates by monitoring speed of the rotor shaft in transmission. Rotational speed is monitored by keeping track of fluctuations of frequency of pulses received from speed sensor during predetermined time intervals. After these pulses are amplified, they are transmitted to the receiver in the rear of vehicle where Dynamic Traffic Light is installed. One trivial but inconvenient way of transmission of the mentioned pulses is to extend a wire from transmitter (which is installed near the speedometer) to the receiver in the rear of vehicle. Nevertheless, I have discovered that the two most commonly used microchips, namely NE555 timer and LM339 operational amplifier, can together create a remarkable transmitter and receiver with an astounding transmission rate (more than 19 megahertz). While these transmitter and receiver are highly immune to static, data transmission can be performed through the same twisted wire from which both the transmitter and receiver obtain their power (without change of voltage or current), to a distance of more than 130 m.

One unit of speed which represents one unit of frequency is the value of dip switch plus 1 (more about dip switch later). When difference between current speed and the value stored in memory is at least one unit, a flashing of light(s) of a particular color occur, and memory is updated to hold current value of a counter which receives speed sensor pulses of the vehicle from the pulse detector.

The value stored in said memory is referred to as reference speed. The value stored in said counter is referred to as the current speed of the vehicle.

The counting section counts the pulses received from the pulse detector for a period of time that is determined by timebase. Output of said counter is fed to a comparator 1, to said memory and to an arithmetic logic unit ALU or subtracter. Outputs of said memory is fed to said comparator 1, to said ALU and to the speed level determinator. Said comparator 1 realizes whether speed of the vehicle on which Dynamic traffic Light is installed is increasing or decreasing by comparing the current value of said counter (current speed) with a previous value of said counter which is stored in said memory (reference speed). In order to recognize whether the speed has changed by one unit or not, at every moment, outputs of said comparator 1 instructs said ALU to subtract the current value of said counter from the value of said counter stored in said memory or vice versa, which ever generates a positive result. The output of said ALU (which is always a positive binary number) and the value set by dip switch feed a comparator 2.

Decision maker section (gates) receives its inputs from said comparator 1 and said comparator 2. If, at the end of a time interval, said comparator 2 realizes that the result of subtraction performed by said ALU is at least equal to one unit of the speed then:

a) If at the same moment, said comparator 1 is realizing that value of said counter is less than the value latched in said memory, then the decision making section generates the pulse (named pulse A) to indicate that the speed has decreased by one unit.

b) If at the same moment said comparator 1 is realizing that value of said counter is greater than the value latched in said memory, the decision maker section generates the pulse (named pulse B) to indicate that the speed has increased by one unit.

Only if one of the two mentioned pulses are generated, the decision maker section updates the value stored in said memory to current value of said counter. Other wise, the value stored in said memory (value of said counter at the time that the last pulse A or B was generated) remains unchanged until at the end of a time interval, the value of said counter is at least one unit greater than or less than the value stored in said memory. Whether said pulse A or said pulse B is generated or not, at the end of each time interval said counter is reset to zero so that it begins counting from one for the next sample period.

Speed level indicator section obtains its inputs from memory section. Outputs of said speed level indicator section, which is at 5v VDD voltage level, is amplified to 12v Vcc1 (of FIG. 21) by voltage amplifier section whose outputs feed transistors and trigger timers to drive their corresponding relays. The latter turns on a specific set of lamps in order to put in effect the appropriate flashing of lamps and the levels of speed shown in FIG. 4 to FIG. 14.

Latch section makes sure that the first flash of red or orange lamps occurs after at most one unit reduction in the speed. If at the end of first time interval during (in the duration of decrease in the speed) the decision maker section realizes that number of pulses counted by said counter is less than the value stored in said memory (regardless of whether this difference is one unit or not), then the decision maker section activates the latch. The out put of latch generates a pulse similar to said pulse A which is amplified to close relays corresponding to red or orange lights. This assures that as soon as the speed is reduced by 1 km/h (ie: as soon as the difference between value of said counter and the value stored in said memory is one), first flashing of orange or red lights arise. The latch is reset only when at the end of a time interval said comparator 1 realizes that the value represented by said counter is greater than the latched value of said counter (ie: when the current speed is increased to greater than the reference speed).

Since the greatest binary number that 8 bits can represent is 255, maximum 255 km/h can be monitored by 8 bits, when the unit of speed is y, dip switch is set to (y−1), and time base is 10 Hz.

Figure 15:
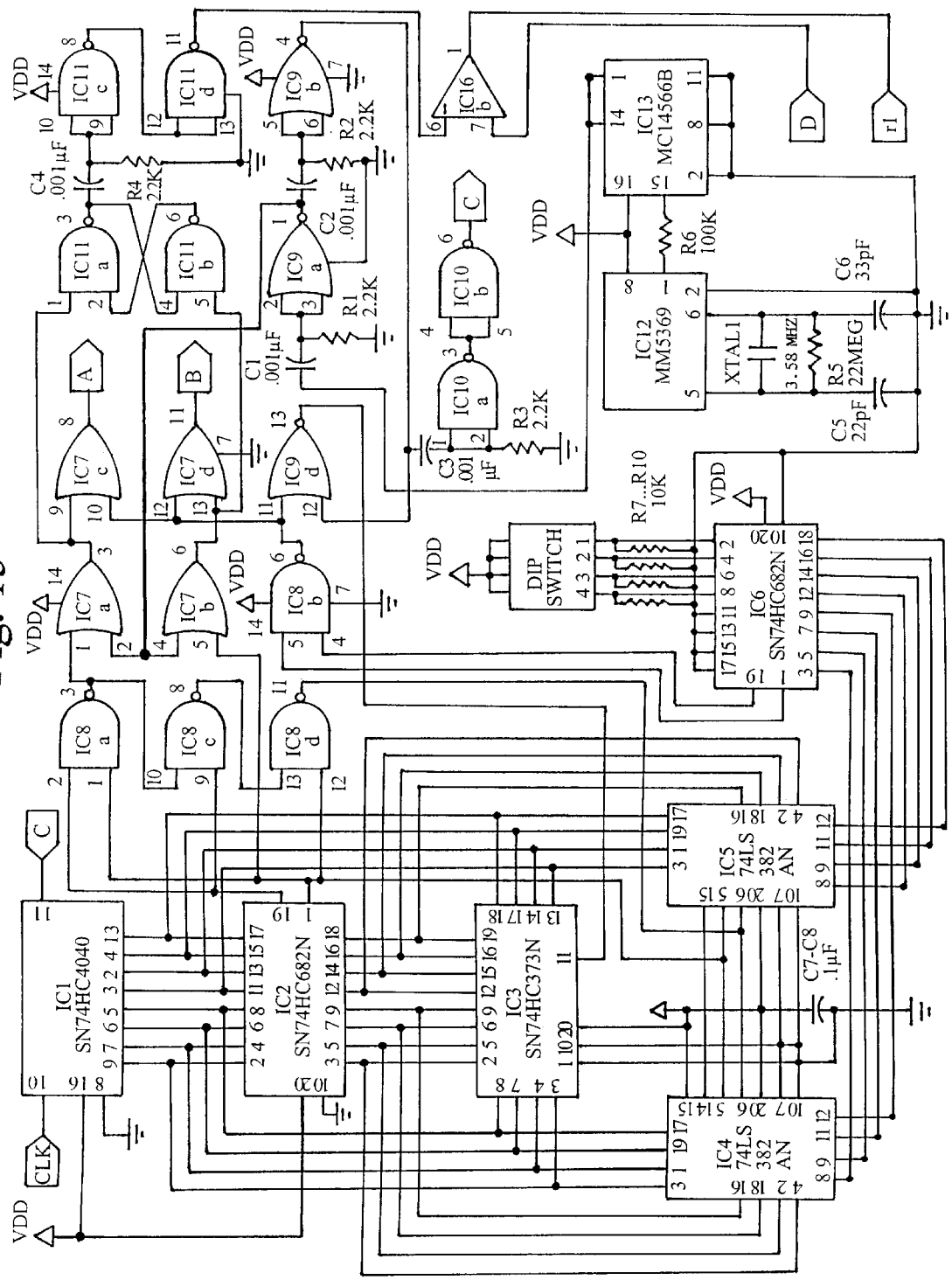
FIG. 15 illustrates how Dynamic Traffic Light produces a pulse A and a pulse B to indicate one unit decrease and increase in speed of vehicle on which Dynamic Traffic Light is installed.

FIG. 15 is the heart of this invention. It produces said pulse A and said pulse B to indicate one unit decrease or increase in the speed respectively. Pin 10 of IC1 which is a 4040 12 stage binary counter is fed by out put pin 2 of pulse receiver IC23-a of FIG. 24. Said counter counts the incoming pulses from the pulse receiver (IC23-a) during time intervals of 0.1 s. Only the first 8 least significant bits of this counter are needed. The 60 Hz signal is generated by IC12, an MM5369 17, stage programmable oscillator/divider and its support components. Here said IC12 uses a 3.58 Hz color burst crystal to produce a stable and accurate 60 Hz reference. IC13 consists of one 14556 which contains three independent function block. This IC is used here as a divide by 10 counter to generate 10 Hz time base.

The output of said divider IC13 is fed to three pulse generators consisting of: IC9-a, C1 and R1; IC9-b, C2 and R2; and IC10-a, C3 and R3. The pulse generators produce three sequential pulses respectively: a so named decision pulse, an update pulse and a clear pulse. Said counter feeds IC2 an 8 bit magnitude comparator, IC3 an 8 bit transparent latch (or said memory), and (IC4 and IC5) two 4 bit arithmetic logic units cascaded to form an 8 bit ALU which is used as said subtracter.

Whether value of said counter should be reduced from the value latched by said IC3 or vice versa (to recognize one unit change in the speed) is determined by select inputs pin 5, 6 and 7 of said IC4–IC5. Pin 7 of said ALUs are grounded. When the current value of said counter is greater than the previous value of said counter which is latched, pin 1 of said IC2 (an 8 bit magnitude comparator) is pulled low. This low creates a high at out put pin 3 of IC8-a (NAND gate) which together with high at output pin 19 of said IC2 pull low the out put at pin 8 of IC8-c. The latter creates a high at output pin 11 of IC8-d which in turn sends a high voltage to select input pin 6 of said IC4–IC5. At the same time, the low output at pin 1 of said IC2 feeds select input pin 5 of said ALUs. So the value latched by said IC3 is reduced from the current value of said counter.

When the value latched by said IC3 is greater than the current value of said counter, both outputs pin 1 and pin 19 of said IC2 go high. And this time, the chain of the outputs of said IC8-a, said IC8-c and said IC8-d create a low at pin 6 of said ALUs while high voltage at pin 1 of said IC2 feeds pin 5 of said ALUs. Therefore, current value of said counter is reduced from the value latched by said IC3. Out puts of said IC2 are never pulled low simultaneously. The result of subtraction, which is always a positive binary number, is fed to IC6 (a magnitude comparator). The latter receives 4 least significant bits of its second set of 8 bits input from dip switch, and the other 4 most significant bits are grounded. Only 4 bits are sufficient to represent a value large enough as one unit of speed set by dip switch.

When, at the end of a time interval, said decision pulse (output pin 1 of said IC9-a) pulls low input pin 2 and pin 4 of IC7-a and IC7-b (two OR gates) respectively, either input pin 1 of said IC7-a or input pin 5 of said IC7-b is already pulled low. Simultaneously, if the results of subtraction is greater than the value set by dip switch (ie: greater than or equal to one unit of speed), then both outputs pin 1 and pin 19 of said IC6 are high. These high voltages at inputs pin 4 and pin 5 of IC8-b pull low input at pin 11 of IC9-d, at pin 10 of IC7-c and at pin 12 of IC7-d. The result is that, depending to whether pin 1 of said IC7-a or pin 5 of said IC7-b is pulled low, either said pulse A is generated at output pin 8 of said IC7-c or said pulse B is generated at output pin 11 of said IC7-d. Only if said pulse A or said pulse B is generated, the update pulse (output pin 4 of said IC9-b) updates said IC3 (the latch). Whether said pulse A or said pulse B is generated or not, at the end of every time interval said counter is reset by said clear pulse (output pin 6 of IC10-b).

IC11-a together with IC11-b (NAND gates) form an RS latch. If the speed is reduced so that number of pulses counted during a time interval is at least one less than the latched value of said counter (at outputs of said IC3), then the decision pulse (at pin 1 of said IC9-a) pulls low output pin 3 of said IC7-a which in turn pulls low input pin 1 of said IC11-a while input pin 5 of said IC11-b remains high. This latches output Q of the RS latch (pin 3 of said IC11-a) at high state. This high is fed to a pulse generator consisting of IC11-c, IC11-d, IC6-b, C4 and R4. The generated high pulse pulls low ($r_1$) output pin 13 of IC16-d. The effect is as said pulse A was generated.

Figure 16:
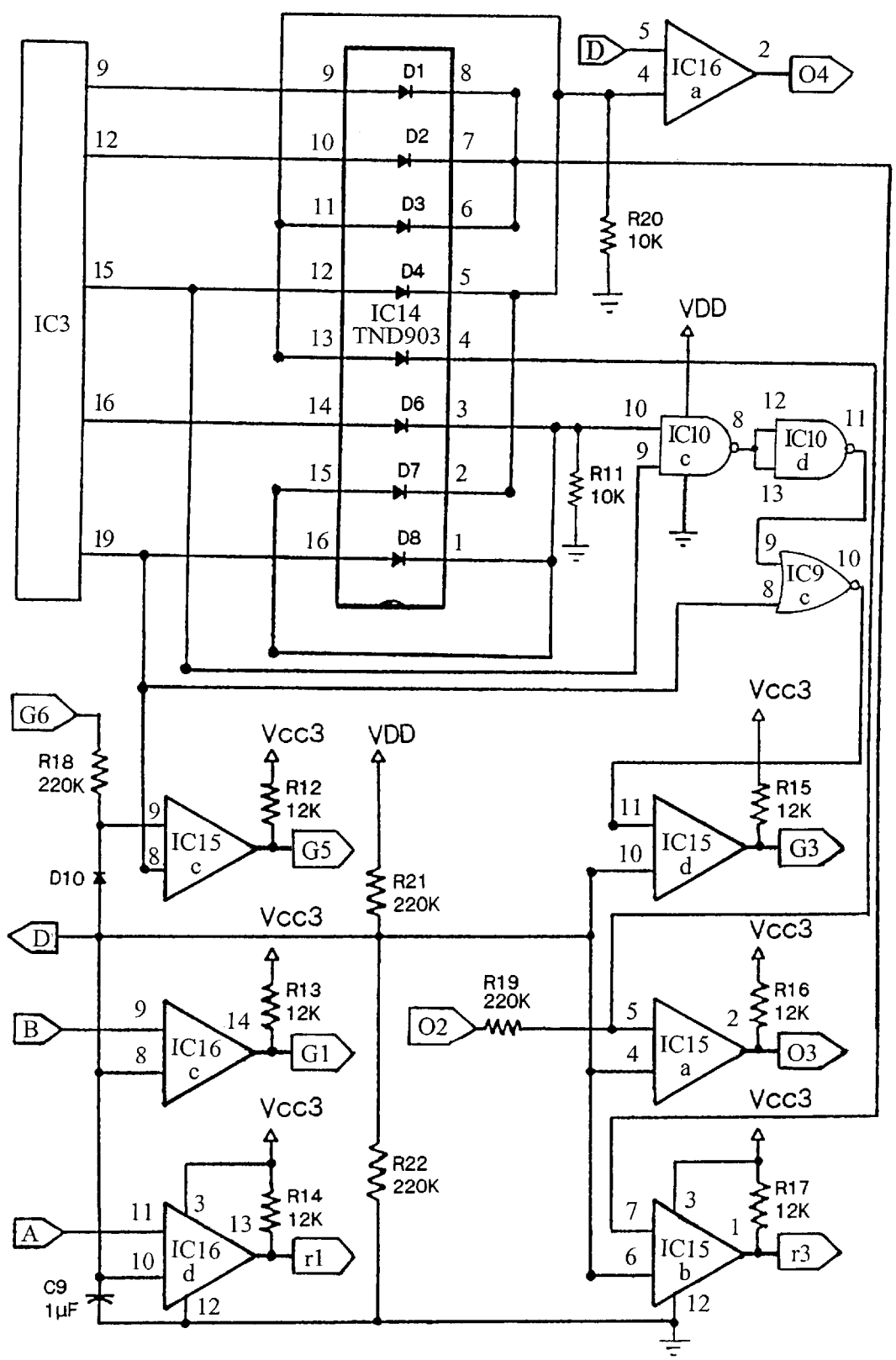
FIG. 16 illustrates a voltage comparator/amplifiers and a speed level determinator which consists of diodes and logical gates.

FIG. 16 illustrates a voltage divider which generates a 2.5 volts reference by dropping the regulated supply voltage (VDD) across two identical resistors R21 and R22, filtering it and feeding it to eight op-amps configured as voltage comparators/amplifiers. FIG. 16 also illustrates the speed level determinator which consists of a set of eight diodes (D1–D8), three gates (IC10-c, IC10-d and IC9-c) and voltage comparators/amplifiers (IC15-a, IC15-b, IC15-c and IC15-d). Voltage comparator/amplifiers (IC16-c and said IC16-d) amplify the pulse A and the pulse B. Outputs of the circuitry in FIG. 16 are used to drive a number of relays for powering the lights.

Said speed level determinator obtains its inputs from said memory (IC3). When one unit of speed is chosen to be 3 km/h and dip switch is set to binary number 2, each pulse represents 1 km/h of the speed of the vehicle. Hence, the binary number latched at outputs of said IC3 is in fact, the speed of the vehicle. The outputs of said speed level determinator, which is at said VDD level, is amplified to Vcc level by the voltage comparator/amplifier section, whose outputs trigger timers in FIG. 17 to drive relays in FIGS. 19–20. The relays turn on a specific set of lamps in order to put in effect the appropriate flashing of the lights and the levels of the speed shown in FIGS. 3–13. Since few lamps in FIG. 25 may get voltage or ground from the same relay in FIGS. 19–20, and since few relays may operate at the same time, few lamps may get voltage or ground simultaneously. But only a specific set of lights should obtain both VCC and ground connections concurrently to implement a unique function at one time.

Figure 20:
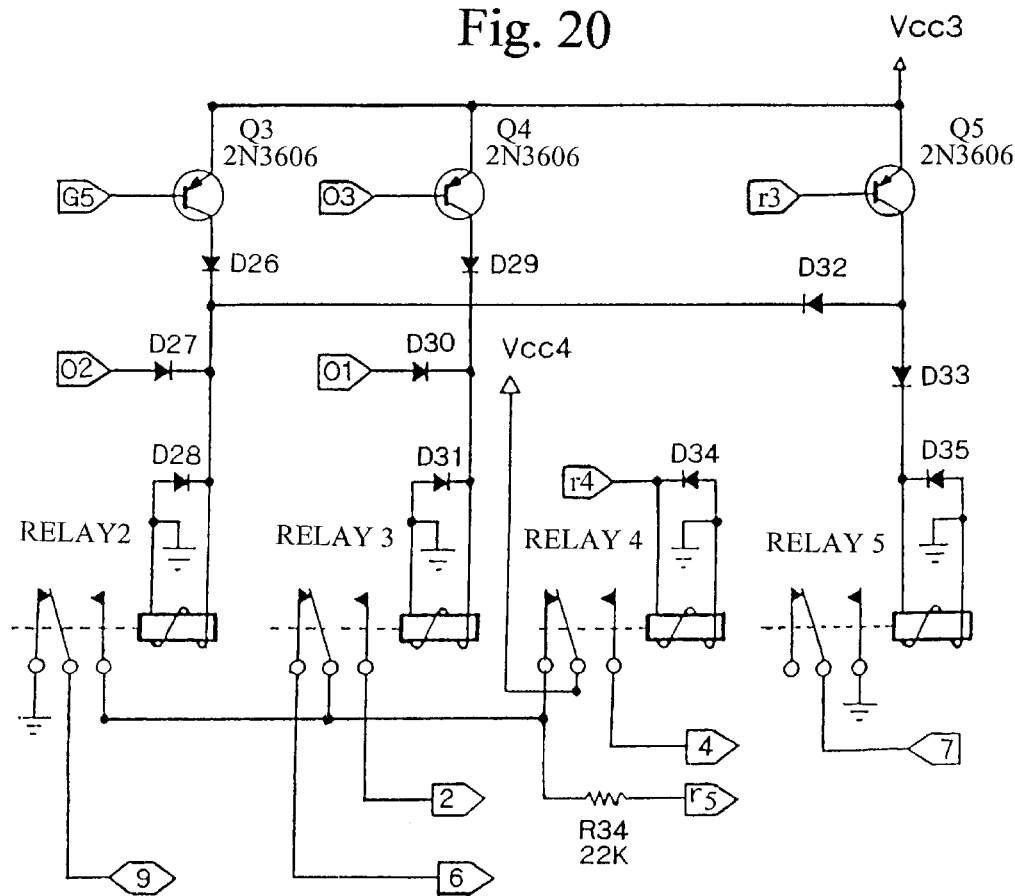

As long as relays are not activated, the green lights LG1, LG2 and LG3 receive 12v voltage Vcc4 from output 6 of relay 3 in FIG. 20, and output 9 of relay 2 in FIG. 20 provides ground for the green lights LG1 and LG2. So only these two lights glow to indicates the speed higher than 31 km/h but lower than 96 km/h as shown in FIG. 3.

Figure 17:
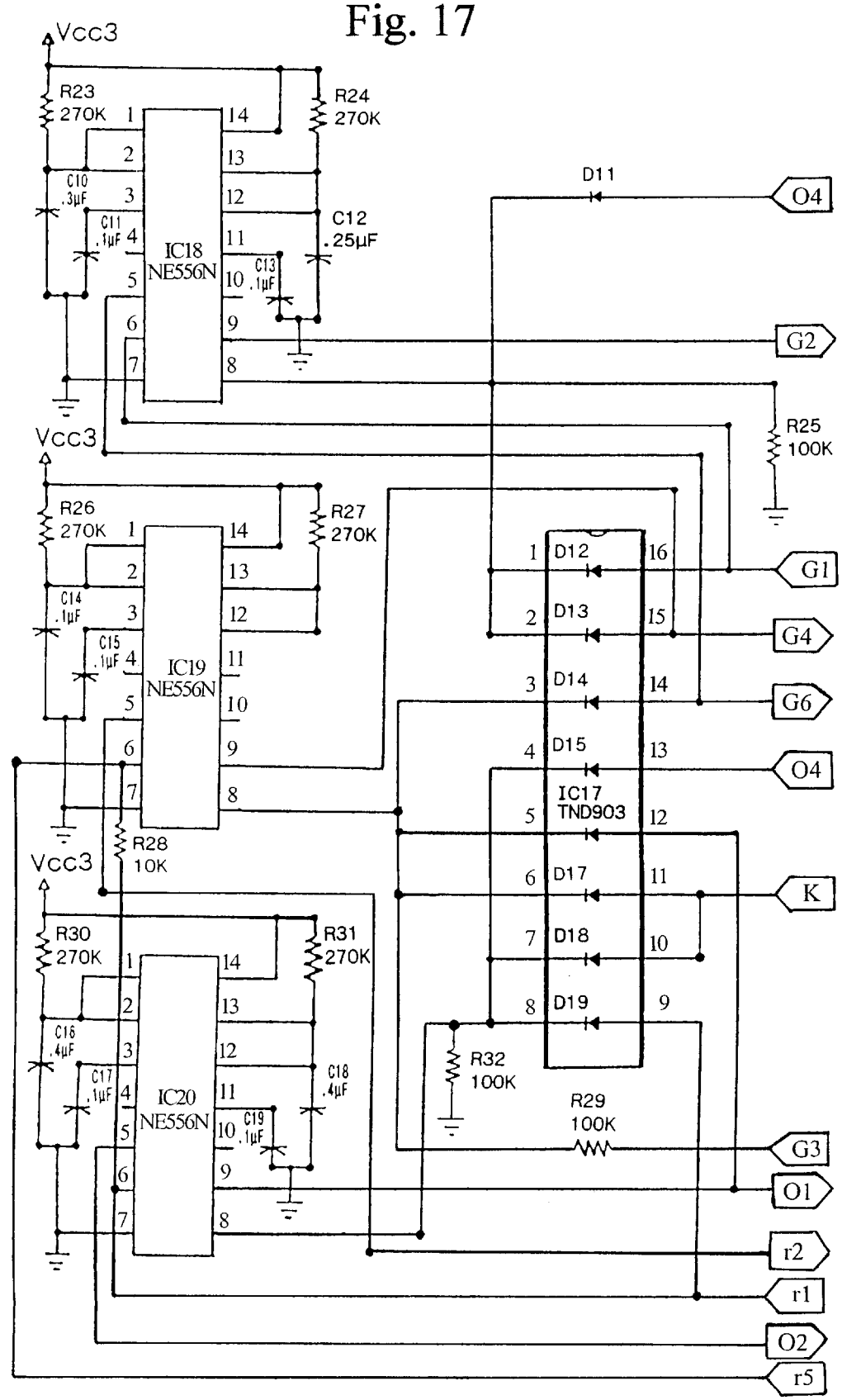
FIG. 17 shows timers needed to drive a number of relays to power the lights.

When the speed increases and said pulse B is generated, output (G1) pin 14 of said IC16-c is pulled low to pull low inputs pin 6 and 8 of dual timer IC18 in FIG. 17 to generate a pulse (G2) at output pin 9 of said timer IC18 and pulse (G6) at output pin 5 of said timer IC18. Said pulse (G2) activates relay 1 in FIG. 19 during a time determined by R24 and C12, to provide output 3 of said relay 1 for the green light LG3 in FIG. 25, and to flash on this light. This indicates one unit increase in the speed.

Said IC10-c, said IC10-d and said IC9-c together recognize binary number that is equal to or greater than decimal number 96. That is, when the speed is greater than 95 km/h, input at pin 11 of comparator said IC15-d is pulled low to pull low pulse (G3) at pin 13 of this IC for generating a pulse (G4) at output pin 9 of dual timer IC19 in FIG. 17 which energizes said relay 1 for providing ground connection (3) of said relay 1 in FIG. 19 for keeping the green light LG3 in FIG. 25 on while the green lights LG1 and LG2 remain on and the speed is greater than 95 km/h.

When the speed (that is greater than 95 km/h) increases by one unit and said pulse B is generated, said pulse (G6) is fed through D14 in FIG. 17 to pin 8 of said timer IC19 to pull low said pulse (G4) to release said relay 1 and flash off the green light LG3. Since said pulse (G2) should not close said relay 1 when said pulse (G4) momentarily releases said relay 1 to flash off the green light LG3, said pulse (G4) disables said pulse (G2) by feeding pin 8 of said timer IC18 through diode D13.

If the speed is greater than 127 km/h, pin 19 of said IC3 (FIG. 16) pulls low (G5) output pin 14 of said comparator IC15-c which drives transistor Q3 to activate said relay 2 as shown in FIG. 20. Consequently, said output 9 of said relay 2 (ground connection) is disconnected from the green lights LG1 and LG2 to turn off these lamps. This result in energizing only the green light LG3 by said relay 1 to indicate that the speed is 127 km/h or higher as shown in FIG. 13. If this high speed increases at least by one unit, said pulse (G6) pulls low said pulse (G5). As a result, said relay 2 is momentarily released by said transistor Q3 in FIG. 20, while said pulse (G4) is pulled low by said pulse (G6) to release said relay 1. While said output 9 of said relay 2 provides ground connection for the green lights LG1 and LG2 to flash on these lights, said output 3 of said relay 1 is disconnected to flash off the green light LG3. The result is that per each unit increase in the speed which is greater than 127 km/h, the green light LG3 flashes off during a time determined by R23 and C10 while the green lights LG1 and LG2 flash on during the same time, as shown in FIGS. 3 and 13.

Figure 18:
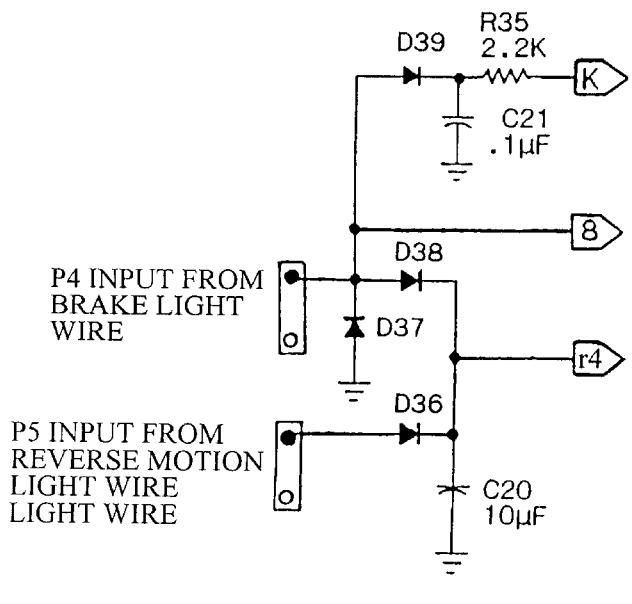
FIGS. 18, 19 and 20 illustrate the relays to power the lights of Dynamic Traffic Light.

When the speed is decreased and said pulse A is generated, said pulse ($r_1$) is pulled low to pull low input pin 6 of said timer IC19. This generates a pulse (r2) at output pin 5 of said timer IC19 in FIG. 17. Said pulse ($r_1$) also pulls low input pin 6 and pin 8 of dual timer IC20 in FIG. 17 to trigger both timers of said timer IC20 in order to generate a pulse (O1) at output pin 9 and a pulse (O2) at output pin 5 of said timer IC20. At this time, there are two possibilities:

a) If the brake is not applied, output voltage ($r_4$) FIG. 18 remains low and relay 4 remains inactivated. Hence, output ($r_5$) of said relay 4 is fed through R34 to pin 6 of said timer IC19 to prevent this timer from producing said pulse ($r_2$) at output pin 5 of said timer IC19 which would energize said relay 1 for disconnecting ground 5 from the orange light LO3. Said pulse (O1) activates said relay 3 during a time determined by R31 and C18. Said output 2 of said relay 3 provides said Vcc4 for the orange lights LO1 and LO2. Concurrently, said pulse (O2) activates said relay 2 (during a time determined by R30 and C16) to disconnect said output 9 of said relay 2 (ground connection) from the green lights LG1 and LG2. With said relay 2 activated, said output 9 of said relay 2 provides said Vcc4 for the orange light LO3, and output 5 of the inactive said relay 1 provides ground for the orange light LO3.

Said pulse (O1) also feeds pin 8 of said IC19 to pull low said pulse (G4) at output pin 9 of said IC19 in order to release said relay 1 for disconnecting said output (3) of said relay 1 (ground connection) from the green light LG3 to flash off this light when said orange lights flash on. Hence, when the speed is reduced without the brake pedal being pressed, every time said pulse A is generated, all of the green lights flash off and all of the orange lights flash on.

Figure 25:
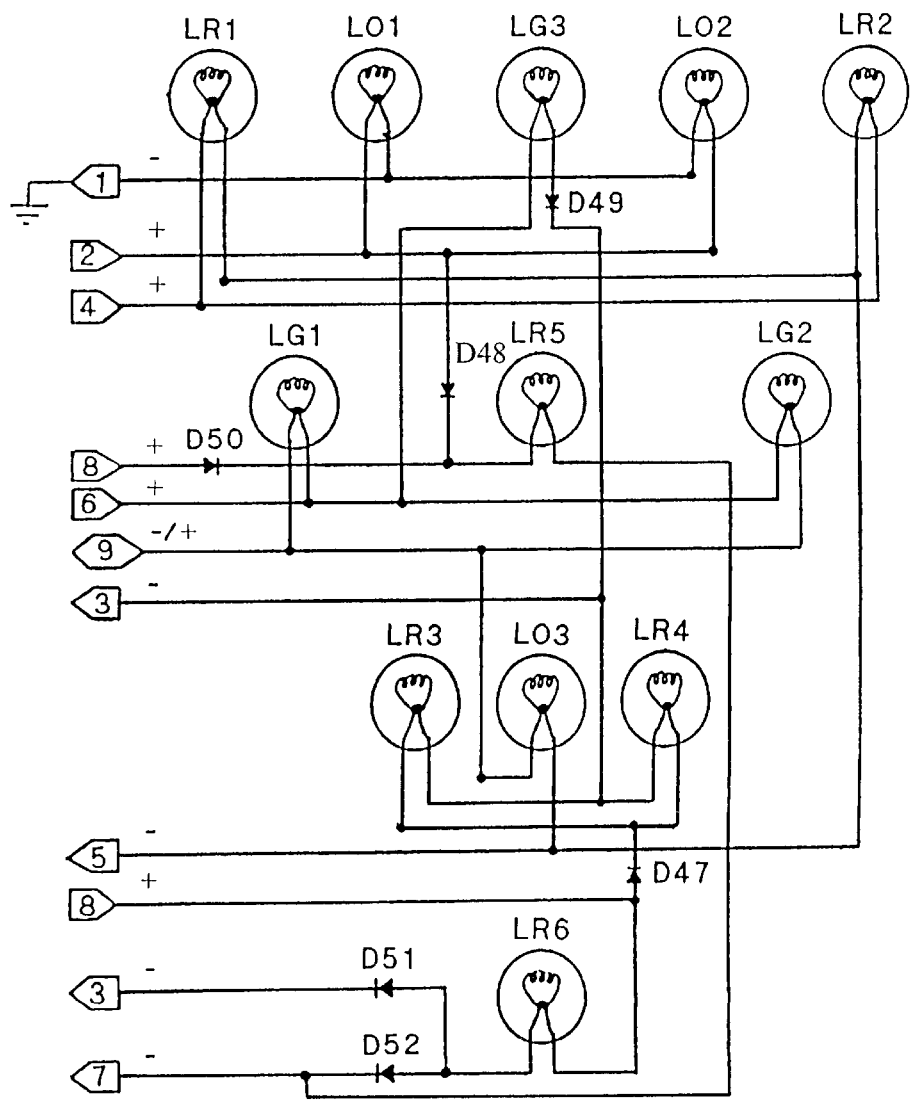
FIG. 25 illustrates the connection of lamps of Dynamic Traffic Light.

When the speed is under 32 km/h, the following happen:

i) Input pin 5 of said IC15-a is pulled low (by pin 4 of IC14) in order to pull low pulse (O3) at output pin 2 of the IC15-a for driving transistor Q4 which activates said relay 3, in order to disconnect said output 6 of said relay 3 and turn off all of the green lights LG1, LG2 and LG3 in FIG. 25. Output 2 of said relay 3 provides said Vcc4 for the orange lights LO1 and LO2 in FIG. 25 which always have ground connection 1 in FIG. 25. Thus when the speed is under 32 km/h and the brake is not applied on the vehicle, the orange lights LO1 and LO2 remain on while all other lights are turned off as shown in FIG. 7.

ii) When the speed is reduced at least by one predetermined unit and said pulse A is generated, said pulse (O2) activates said relay 2 in FIG. 20. Said output 9 of said relay 2 provides said Vcc4 for the orange light LO3, and said output 5 of said relay 1 grounds the orange light LO3 to flash on this light.

iii) Said pulse (O2) is fed to input pin 5 of the IC15-a to momentarily pull low said pulse (O3) (which momentarily release said relay 3) to flash off the orange lights LO1 and LO2 while the orange light LO3 flashes on. Thus when the speed that is under 32 km/h is reduced at least by one unit while the brake is not being applied on the vehicle, the orange light (LO3) and the orange lights (LO1, LO2) flash on and off interchangeably as shown in FIGS. 8 and 7.

iv) Pulse (O4) at output pin 2 of IC16-a feeds input pin 8 of said timer IC20 to prevent this timer from generating said pulse (O1) when the speed is under 32 km/h and said pulse A is generated. So that said pulse (O1) does not activate said relay 3 to allow flashing off the orange lights LO1 and LO2 when said pulse A results in generating said pulse (O3). Said pulse (O4) also prevents production of said pulse (G2) to prevent flashing of said pulse (G2), to prevent the green lights from flashing when the speed is under 32 km/h.

b) If the brake is applied the following happen:

i) Said relay 4 is activated by said output voltage ($r_4$) FIG. 18 for disconnecting said voltage Vcc4 from inputs of said relays 2 and said relay 3 which provide said voltage Vcc4 for the orange and green lights in FIG. 25. Also with said relay 4 in energized condition, said output ($r_5$) of said relay 4 prevents creation of said pulse ($r_2$). Instead, output 4 of said relay 4 provides said Vcc4 for the red lights LR1 and LR2 while they are grounded by said output 5 of said relay 1.

ii) Said output ($r_5$) of said relay 4 is pulled low in order to let input pin 6 of said timer IC19 to be pulled low by said pulse ($r_1$), for producing said pulse ($r_2$). Said pulse ($r_2$) energizes said relay 1 for providing said ground connection (3) for the red lights LR3 and LR4 which receive said output voltage (8) in FIG. 18.

iii) Output K FIG. 18 is fed through D17 and D18 to pin 8 of said timer IC19 and said timer IC20, to prevent these timers from generating said pulses (G4) and (O1).

With the absence of said pulse (G4), said pulse ($r_2$), which lasts for a period of time determined by R26 and C14, activates said relay 1 to disconnect said output 5 of this relay from the red lights LR1 and LR2, and to provide said output 3 of said relay 1 for the red lights LR3, LR4 and LR6. Since said pulse ($r_2$) can be generated up to ten times per second, said pulse ($r_2$) should not last long. As a result, said relay 1 is not closed long enough to turn on a 12 volts light brightly. So 8 v lamps should be chosen or the red lights LR3 and LR4, and 12 v lamps should be chosen for the red light LR6. Therefore while the red lights LR3 and LR4 glow brightly for the time that said pulse r2 lasts, the red light LR6 does not shine adequately during the same time. Consequently, as the speed is reduced faster, the red light LR6 glows brighter.

If the speed is under 8 km/h (and the brake is applied), in addition to the red lights LR1 and LR2 which get said output 4 of said relay 4, the red lights LR5 and LR6 also turn on since these lights are provided said output voltage (8) in FIG. 18, and they are grounded by said output 7 of relay 5. As a result, the red lights LR1, LR2, LR5 and LR6 remain on.

When the speed is less than 8 km/h, output pin 6, 7 and 8 of said IC14 are pulled low by said IC3 to pull low ($r_3$), output pin 1 of the IC15-b. Said pulse ($r_3$) drives transistor Q5 which energizes said relay 5 in FIG. 20. Output 7 of said relay 5 provides ground connection for the red lights LR5 and LR6 in FIG. 25. Even when the brake is not applied and said output (8) of FIG. 18 is low, the red light LR5 gains said voltage Vcc4 from output 2 of said relay 3 (which is activated by said pulse (O3) at output pin 2 of the IC15-a). Therefore, when the speed is under 8 km/h, regardless of braking the red light LR5 remains on as depicted in FIGS. 9 and 12. When the brake is not applied and the speed is under 8 km/h, in addition to the red light LR5, the orange lights LO1, LO2, LO3 also remain on as shown in FIG. 9.

When vehicle is set for reverse motion, only input P5 FIG. 18 is high. As a result, said output voltage ($r_4$) FIG. 18 has the same effects as mentioned before, and outputs (K) and (8) FIG. 18 remain low. Thus all lights of the three colors turn off. Only when the brake is applied, red lights turn on as before.

FIG. 17 illustrates a set of eight diodes (D12–D19) and the timers (said timer IC18, said timer IC19 and said timer IC20) for energizing the relays needed to power the lights as explained.

Figure 19:
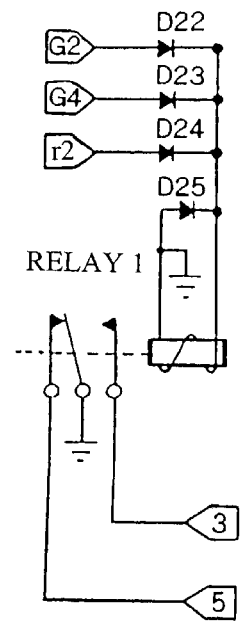

FIG. 18 shows that P4 input from the brake light wire, and P5 input from rear motion light wire are directed to affect circuits in FIGS. 18–20 to control the relays as explained.

FIG. 19 shows said relay 1 that is energized by said outputs (G2), (G4) and (r2) of the circuitry in FIG. 17. Said pulse (G2) activates said relay 1 during a time determined by R24 and C12, to provide said output 3 of this relay for the green light LG3, and to flash on this light. This indicates one unit increase in the speed. The timer of said timer IC19 which has pin 9 as output is used as an inverter whose output (G4) can easily close said relay 1 for disconnecting ground 5 from the orange light LO3 and for providing ground 3 for the green light LG3 when the speed is greater than 95 km/h as explained.

FIG. 20 shows said transistors (Q3, Q4 and Q5) which are derived by said pulses (r3), (G5) of FIG. 16 and said pulse (G6) of FIG. 17 in order to derive said relay 2, said relay 3 and said relay 5 for controlling the lights as explained.

Figure 21:
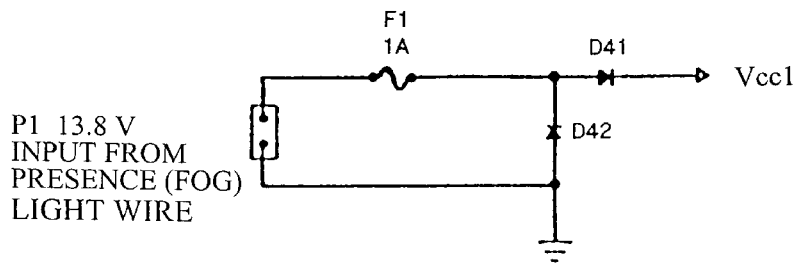
FIGS. 21 and 22 show a pulse amplifier/transmitter which receives speed sensor pulses of the vehicle.
Figure 22:
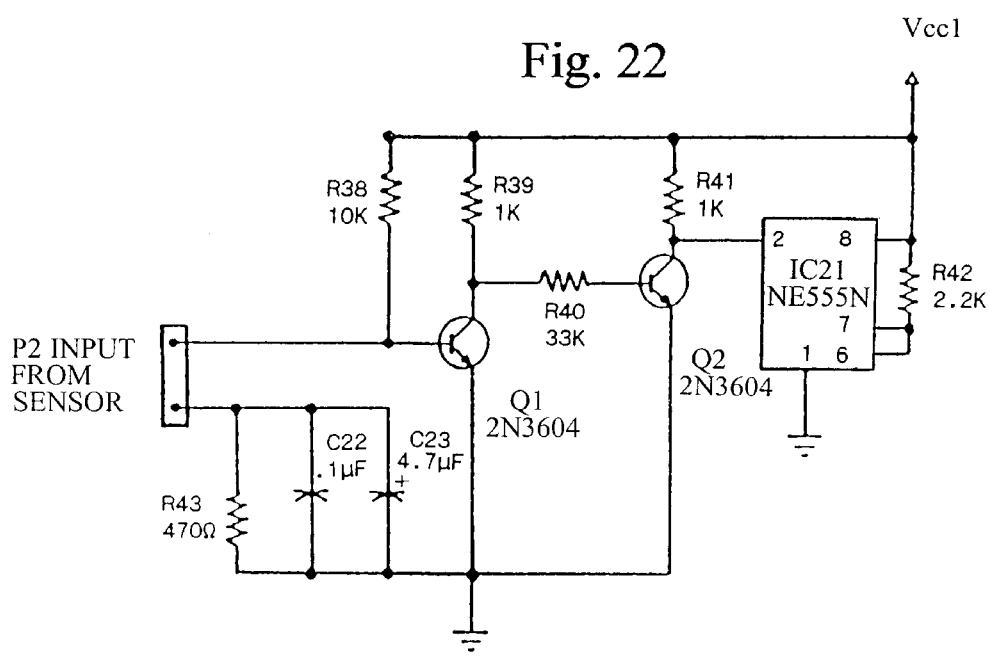

FIG. 21 represents the power supply that obtains its P1 input from fog light fuse or from the wire from which electricity flows through fog light fuse, to power said pulse amplifier/transmitter in FIG. 22.

FIG. 22 illustrates the pulse amplifier/transmitter which consists of transistors (Q1 and Q2), a number of resistors and capacitors and IC21 an NE555 timer. A wire can be branched out from the wire which carries the speed sensor pulses to the speedometer, to provide P2 input for the circuit in FIG. 22 which is installed near the fuse box.

The speed sensor can be connected to P2 input of said pulse amplifier/transmitter, via a twisted pair cable and a 0.1" female Molex connector. One side of the sensor is AC coupled to ground through C22 and C23 capacitors and the other side is passed on to the input amplifier, which is composed of said transistors Q1, Q2 and associated bias resistor. The speed sensor voltage is biased slightly positive to ensure that said Q1 turns on reliably.

The amplified signals are then sent to input Pin 2 of a 555 timer said IC21, which operates as a pulse transmitter. The 555 timer does not feature a capacitor and therefore it is not set in a stable or monostable mode (as a timer). The timer would equally function as a transmitter if it was set in its monostable mode instead of the configuration shown in FIG. 22. In general, for high data transmission rates, a transmitter with no capacitor is more appropriate.

Figure 23:
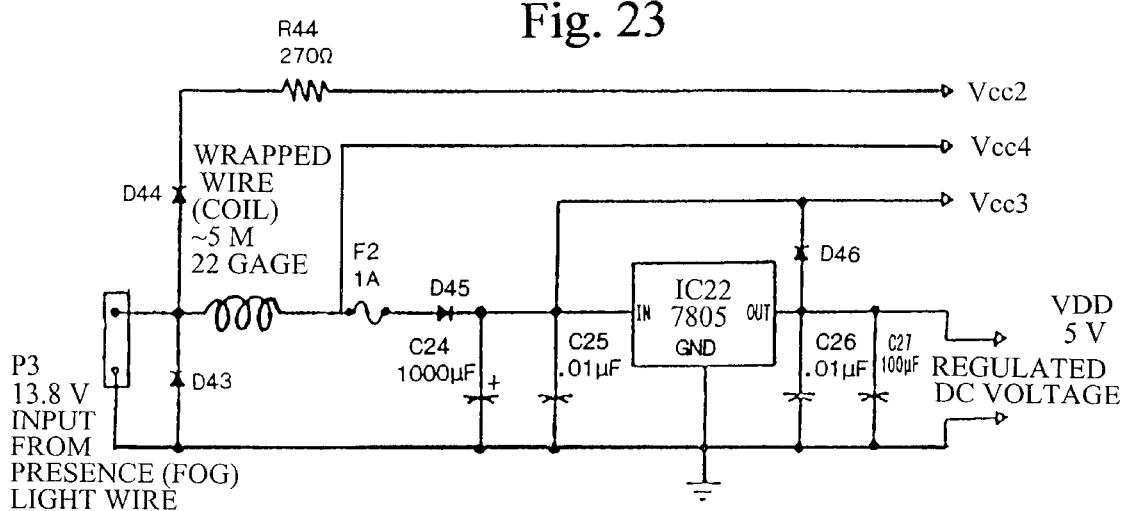
FIG. 23 illustrates a power supply for providing different voltages for different sections of Dynamic Traffic Light.

The pulse transmitter transmits the amplified pulses through fog light fuse (ie: through P1 input of its power supply FIG. 21) to the pulse detector (in the rear of the vehicle) which also gets its 12v voltage Vcc2 from fog light wire P3 input, FIG. 23. There are, however, restrictions for pulse transmission with this method:

i) Vcc1 which is branched off from fog light wire to power amplifier and transmitter at the beginning of line of electricity should not be filtered and should directly or through a rectifier diode power the mention circuit.
 ii) The voltage which is branched off from fog light wire to power the pulse detector (receiver) at the end of line of electricity should not be filtered and should directly (or only through a protection resistor ~270 Ω and/or a rectifier diode) power the pulse detector.
 iii) The voltage mentioned in ii must traverse through a wire (approximately 5 m or longer and could be in the from of a coil) to power circuits other than the pulse detector which like the pulse detector obtain their power further from the beginning of line. In Dynamic Traffic Light the pulse detector obtains its power only through protection resistor R44 and other circuits get their power through a coil FIG. 23.
 iv) Diode D45 must isolate the power supply which generates 12v voltage Vcc3 and the voltage VDD as shown in FIG. 23, to prevent the line of electricity (and said Vcc2) from being filtered.

FIG. 23 represents a power supply that obtains its P3 input from rear fog light wire, and generates said Vcc2 for powering the pulse detector, said Vcc3 for powering the timers, transistors and relays, said Vcc4 for powering the lights through said relay 4 in FIG. 20 and VDD for powering the components in FIG. 15 and creating the voltage reference in FIG. 16.

Figure 24:
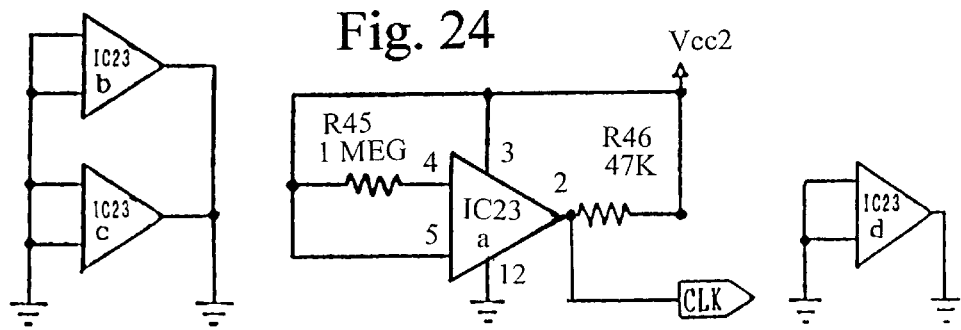
FIG. 24 shows a pulse detector (receiver) which detects pulses sent by the pulse transmitter.

FIG. 24 shows the pulse detector (receiver) said IC23-a whose output is fed to the said counter (IC1) in FIG. 15. The pulse detector is one of the comparator of LM339 (quad comparator), and is set as a non-inverting voltage comparator.

FIG. 25 illustrates the wiring of lamps installed in lamps casing of Dynamic Traffic Light. Since each relay may provide electricity for lamps of different lights, diodes D47 to D52 allow only a specific set of lamps (shown in FIG. 3 to FIG. 13) to be turned on at a time.

More about unit of speed:

A speed sensor which generates at least 20 pulses per revolution of rotor shaft in transmission can be used with this invention; such as 20 pole magnetic resistance element sensors (MRE) and photo coupler sensors. Such sensors assure the production of at least one pulses per time intervals of 0.1 s at 1 km/h of speed, in order to monitor the change of speed satisfactorily. Hence, an appropriate speed sensor which generates an appropriate number of pulses per rotation of rotor shaft should be used.

In order to set the dip switch, we first define the following variables:

n=value set by dip switch which is number of pulses received from sensor during each 0.1 s at ((a selected multiple of unit of speed km/h)−1)km/h.
 p=number of pulses that speed sensor generates per rotation of rotor shaft in transmission.
 u=the selected multiple of unit of speed (which is an standardized speed difference) such as 1 km/h or 3 km/h.

I select u=3 km/h as a value representing a standardized speed difference.

$t_s$=transmission revolution per 0.1 s
 d=differential ratio of a car
 r=radius of wheel (wheel size)
 t=transmission rpm
 c=2πr circumference of wheel
 w=wheel revolutions per minute And from mechanics: w=t/d and (u) speed=w * c⇒w=u/c We want c per centimeter as we have speed per km/h. But since radius of wheel is normally given per inch, we change r to cm:

c=2πr" inch * (2.54 cm)/(1 inch)=5.08πr" cm

We defined u=3 km/h. But we want u as centimeter per minute

→u=3 km/h * 1000 m/km * 100 cm/1 m * 1 h/60 min=5000 cm/min
 W=u/c=(5000 cm/min)/(5.08πr" cm)=(313.3/r") wheel revolution per minute at 3 km/h Also w=t/d→t=w * d Replacing w→t=(313.3 * d)/r"

$t_s$=t * (1 min)/(60 sec) * (1 sec)/(10)=t/600 and n=($t_s$* p)→n=(t/600 * 20)
 →n=t30 Replacing t with (313.3* d)/r" →n=(313.3 * d)/(30 * r")
 →n=(10.44 * d)/r"

Therefore, if for example wheels of a car have radius 15" and differential ratio of that car is 3.5, then assuming that the speed sensor of this car generates 20 pulses per revolution of rotor shaft:

→n=(10.44 * 3.5)/3.5→n=2.4

We round the 2.4 to 2 in order to set the dip switch. Therefore, a flash of a light occurs when the result of subtraction is >2.

The value obtained for dip switch is almost always is a real number. And since we round the number to an integer, the flashing of lamps do not show exactly 3 km/h increase or decrease in speed. Since differential ratio and wheel size are not the same in all cars, each pulse during the same time interval of 0.1 s does not represent the same speed in different cars. Referring to the formula that we obtained for variable n to set the dip switch, the calculation of value of dip switch depends to the variables d, r, and p.

Besides choosing the right speed sensor, car manufacturers who would like to install Dynamic Traffic Light on their cars, may make some adjustment on wheel size (r) and/or on differential ratio (d) to make sure that when different cars travel at the same speed, speed sensor of these cars generates the same number of pulses per each time interval. This also assures that flashing of lamps occur when speed of any vehicle varies by a standard unit of speed (3 km/h). If wheel size is easier to be changed then its adjustments should be done as follows: Since we want the speed sensor to generate at least one pulse per 0.1 second, we consider n a number that is equal to or greater than zero. For example if we choose n=2 (and we set dip switch to 2) when unit of speed is 3 km/h, then 2=(10.44*d)/r" And the differential ratio (d) of each car is known. So we can obtain a value for r: r=(10.44*d)/2

EXAMPLE 1

If differential ratio of a car is 3.5 to 1, then r should be: r=(10.44*3.5)/2=18.27" Therefore, for a car with differential ratio of 3.5, wheel of size 18.27" will result in one flash per exactly every 3.0 km/h increase or decrease in speed, if dip switch is set to 2. So we can maintain an standard unit of speed for flashing a lamp of Dynamic Traffic Light and for displaying speed levels. Similarly the differential ratio can be adjusted in accordance with a selected value for the wheel size and for variable n. Alternatively, variable P can be adjusted based on a fixed value for the differential ratio (d), wheel size (r) and variable n.

PARTS LIST

All resistor are ¼-watt, 5%

| | |
|---|---|
| R1–R4, R35, R42 — 2200 ohms | R34 — 22,000 ohms |
| R5 — 22 megohms | R40 — 33,000 ohms |
| R6, R25, R29, R32 — 100,000 ohms | R43 — 470 ohms |
| R7–R11, R20, R28, R38 — 10,000 ohms | R44 — 270 ohms |
| R12–R17 — 12,000 ohms | R45 — 1 megohms |
| R18, R19, R21, R22 — 220,000 ohms | R46 — 12,000 ohms |
| R23, R24, R26, R27, R30, R31 — 270,000 ohms | R39, R41 — 1,000 ohms |

Capacitors

Capacitors C20, C23 and C24 are electrolytic, all others are disc

| | |
|---|---|
| C1, C4 — 0.001 μF disc | C12 — 0.25 μF disk |
| C5 — 22 pF disc | C16, C18 — 0.4 μF disk |
| C6 — 33 pF disc | C20 — 10 μF, 16 volts |
| C7–C9, C11, C14, C15, C17, C19, | C23 — 4.7 μF, 16 volts |
| | C24 — 1,000 μF, 25 v |
| C21, C22 — 0.1 μF disc | C25, C26 — 0.01 μF disk |
| C10 — 0.3 μF disc | C27 — 100 μF disk |

-continued

PARTS LIST

Semiconductors

IC1 — SN74HC4040 asynchronous 12-bit binary counter
IC2, IC5 — SN74HC682N 8-bit magnitude comparators
IC3 — SN74HC373N octal D-type transparent latch with 3-state output
IC4, IC5 — SN74LS382AN 4-bit arithmetic logic units
IC7 — SN74HC32N quadruple 2-input positive-or gates
IC8, IC10, IC11 — SN74HCOON quadruple 2-input positive-nand gates
IC9 — SN74HCO2N quadruple 2-input positive-nor gates
IC12 — MM5369 17-stage oscillator/divider
IC13 — MC14566B industrial time base generator
IC14 (D1–D8), IC17 (D12–D19) — TND903 silicon diode arrays
IC15, IC16, IC23 — LM339N quad comparators
IC18, IC19, IC20 — NE556N dual timers
IC21 — NE555N timer
IC22 — 805 voltage regulator

DIODES

D22–D25, D27, D28, D30, D31, D34, D35 — 1N4148 silicon diode
D25, D29, D32, D33, D36–D39, D41–46 — 1N4004 rectifier diode
D47–D52 — 1N5339B

TRANSISTORS

Q1, Q2 — 2N3904 NPN transistors
Q3, Q4, Q5 — 2N3906 PNP transistors

Relays

Relay 1 . . . Relay 5 — HGSR51111POO 12 volts mercury to mercury, form C relays from CP-Clare
Note:
Testing was performed by SPDT DS1-M Aromat relays. But in order to avoid resonance when relays operate, I introduce the above relays.

MISCELLANEOUS

F1, F2 — 1 amp slow blow fuse
S1 — 4 position dip switch
XTAL1 — 3.58-MHZ color-burst crystal
Wrapped wire or coil 5 m long 22 gage
12 sockets for bayonet lamps
LG1, LG2, LG3, LO1, LO2, LO3, LR1, LR2, LR5, LR6 — 12 volts bayonet lamps
LR3, LR4 — 8 volts bayonet lamps

What is claimed is:

1. A vehicle signalling display device, to be mounted on an automotive vehicle so that signalling lights of said device are visible for drivers of following vehicles, comprising:

a) means for controlling said signalling lights in accordance with speed of the vehicle and regardless of operation and position of accelerator pedal of the vehicle; and b) means for visualizing a standarized amount of decrease in the speed of the vehicle by flashing at least one light of said signalling lights when the speed of the vehicle is decreased by the standardized amount;

c) means for flashing at least one red light (LR3) of said signalling lights every time that the speed of the vehicle is greater than a first predetermined speed and the speed is reduced at least by a predetermined value while brake is being applied on the vehicle and speed sensor means of the vehicle is generating pulses; wherein said red light (LR3) flashes faster and glows brighter as the rate of deceleration of the vehicle increases by braking; and d) means for flashing first and second orange lights (LO1, LO2) of said signalling lights every time that the speed of the vehicle is greater than said first predetermined speed and the speed is reduced at least by the predetermined value while the brake is not being applied on the vehicle, in order to indicate the rate of the deceleration of the vehicle without braking.

2. The vehicle signalling display device according to claim 1, further comprising means for turning on said first and second orange lights (LO1, LO2) of said signalling lights without flashing while the speed of the vehicle is less than a second predetermined speed and the brake is not being applied on the vehicle; wherein said second predetermined speed is greater than said first predetermined speed.

3. The vehicle signalling display device according to claim 2, further comprising means for flashing said first and second orange lights (LO1, LO2) and third orange light (LO3) of said signalling lights whenever the speed of the vehicle is greater than said first predetermined speed and the speed is reduced at least by a standardized value while the brake is not being applied on the vehicle.

4. The vehicle signalling display device according to claim 2, further comprising means for turning on first and second green lights (LG1, LG2) of said signalling lights while the speed of the vehicle is greater than said second predetermined speed, in order to indicate forward motion of the vehicle with constant speed.

5. The vehicle signalling display device according to claim 4, further comprising means for flashing third green light (LG3) of said signalling lights when the speed of the vehicle is greater than said second predetermined speed and the speed is increased at least by said standardized value.

6. A vehicle signalling display device, to be mounted on an automotive vehicle so that signalling lights of said device are visible for drivers of following vehicles, comprising:
   a) means for controlling said signalling lights in accordance with speed of the vehicle and regardless of operation and position of accelerator pedal of the vehicle; and
   b) means for turning on a distinct arrangement of a number of said signalling lights for indicating different ranges of the speed of the vehicle;
   c) means for turning on at least one red light (LR5) of said signalling lights steady without flashing and regardless of braking while the speed of the vehicle is between a first predetermined speed and zero km/h and while the vehicle is stopped; wherein said red light (LR5) is also turned on automatically without flashing if at least the drive wheels of the vehicle are blocked by applying brake on the vehicle for preventing creation of input pulses to said device by a speed sensor means of the vehicle while the vehicle is in motion at any speed;
   d) means for turning on at least one orange (LO1) of said signalling lights while the speed of the vehicle is less than a second predetermined speed and greater than said first predetermined speed, and only while the brake is not being applied on the vehicle, in order to indicate low speed of the vehicle
   e) means for turning on at least one green light (LG1) of said signalling lights only when the speed of the vehicle is greater than or equal to said second predetermined speed while the brake is not being applied on the vehicle, in order to indicate forward motion of the vehicle with constant speed.

7. The vehicle signalling display device according to claim 6, further comprising:
   a) means for flashing a first light (LO3) of said signalling lights only when said device realizes that the speed of the vehicle is greater than said first predetermined speed and the speed of the vehicle is reduced.

8. The vehicle signalling display device according to claim 7, further comprising means for flashing second and third red lights (LR3, LR4) of said signalling lights when the speed of the vehicle is reduced at least by a standardized value while the brake is being applied on the vehicle; wherein said red lights (LR3, LR4) flash faster and glow brighter as the magnitude of deceleration increases.

9. A vehicle signalling display device to be mounted on a vehicle in such way that signalling lights of said device are visible for drivers of following vehicles, comprising:
   a) means for turning on a first light (LR5) of said signalling lights, steady without flashing regardless of operation and position of brake pedal of the vehicle, only when said device realizes that speed of the vehicle is less than a first predetermined speed and the brake could be either applied or not; and
   b) means for flashing second light (LO3) of said signalling lights only every time when the speed of the vehicle is reduced by a predetermined unit without applying the brake and when said device realizes that the speed of the vehicle is greater than said first predetermined speed and the vehicle is decelerating only by without applying the brake.

10. The vehicle signalling display device according to claim 9, further comprising means for turning on third light (LO1) of said signalling lights while the speed of the vehicle is greater than said first predetermined speed and less than a second predetermined speed.

11. A vehicle signalling display device to be mounted on a vehicle in such way that signalling lights of said device are visible for drivers of following vehicles, comprising:
   a) timebase generator means for generating equal time intervals;
   b) counter means (IC1) for counting input pulses to said device during each of the equal time intervals; wherein, at the end of a time interval, a value that is present in said counter means corresponds to speed of the vehicle at the end of the time interval;
   c) memory means (IC3) for storing a value that is present in said counter means at the end of a time interval; wherein, a value that is stored in said memory means at the end of a time interval is used as reference value at the end of each of the equal time intervals;
   d) means for realizing a predetermined speed of the vehicle regardless of operation and position of accelerator pedal of the vehicle, in order to turn on a red light (LR5) of said signalling lights steady without flashing regardless of braking, whenever said device realizes that speed of the vehicle is less than the predetermined speed based upon the result from said timebase generator means, counter means and memory means.

12. A vehicle signalling display device to be mounted on an automotive vehicle in such way that signalling lights of said device are visible for drivers of following vehicles, comprising:
   a) timebase generator means for generating equal time intervals;
   b) counter means (IC1) for counting input pulses to said device during each of the equal time intervals; wherein, at the end of a time interval, a value that is present in said counter means corresponds to speed of the vehicle at the end of the time interval;
   c) memory means (IC3) for storing a value that is present in said counter means at the end of a time interval; wherein, a value that is stored in said memory means at the end of a time interval is used as reference value at the end of each of the equal time intervals;
   d) means for realizing that said reference value is equal to, less than or greater than a predetermined speed for determining different ranges of the speed of the vehicle; and e) means for turning on a red light (LR5) of said signalling lights (IC14, IC15b, Q5, relay 3, relay 5) steady without flashing regardless of position and operation of brake pedal of the vehicle, whenever said device realizes that said reference value is less than a predetermined speed.

13. The vehicle signalling display device according to claim 12, further comprising:
   a) first comparator means (IC2) for comparing a value that is present in said counter means with said reference value at the end of each of the equal time intervals; wherein at the end of each of the equal time intervals said first comparator means generates at least one pulse in order to indicate that a value that is present in said counter means is equal to, less than or greater than said reference value;
   b) subtracter means (IC4, IC5) for subtracting, at the end of each of the equal time intervals, a value that is present in said counter means from said reference value or for subtracting said reference value from a value that is present in said counter means, in order to provide a remainder value which is equivalent to the magnitude of difference between said reference value and a value that is present in said counter means.

14. The vehicle signalling device according to claim 13, further comprising:
   a) second comparator means (1C6) for comparing a predetermined value with said remainder value; said second comparator means generates at least one pulse in order to indicate that said remainder value is equal to, less than or greater than said predetermined value;
   b) wherein said input pulses are generated by speed sensor means of the vehicle and, in accordance with duration of the equal time intervals, said speed sensor means of the vehicle is adapted for a differential ratio and/or wheel size of the vehicle of the vehicle, or the differential ratio and/or wheel size are adapted for said speed sensor means of the vehicle, or the differential ratio is adapted for the wheel size or the wheel size is adapted for the differential ratio, in order to generate said input pulses to said device so that at the end of each of the equal time intervals, the number of pulses counted by said counter means is equal to the speed of the vehicle; wherein said adaptations result in standarization of said predetermined value;
   c) gate means (IC7-c) for generating an A pulse at the end of a time interval for indicating decrease, at least by said predetermined value, in a value that is present in said counter means at the end of the time interval relevant to said reference; wherein said gate means generates said A pulse if, at the end of the time interval, said gate means is simultaneously fed (I) by an (IC7-a) pulse resulted from a comparison performed by said first comparator means indicating that the value that is present in said counter means at the end of the time interval is less than said reference value, and (II) by an (IC8-b) pulse resulted from a comparison performed by said second comparator means indicating that said remainder value is equal to or greater than said predetermined value;
   d) said counter means is reset to zero at the end of each of the equal time intervals, in order to count said input pulses to said device during next time interval; wherein, at the end of a time interval, a value that is present in said counter means is stored in said memory means before resetting said counter means to zero if, at the end of the time interval, said (IC8-b) pulse is generated;
   e) means for turning on a distinct arrangement of a number of said signalling lights, in order to visualize said different ranges of the speed of the vehicle; and
   f) means for flashing a light of said signalling lights if, at the end of a time interval, said A pulse is generated.

15. The vehicle signalling display device according to claim 12, further comprising:
   means for visualizing a standardized amount of decrease in the speed of the vehicle by flashing at least one light of said signalling lights when the speed of the vehicle is decreased by the standardized amount.

16. The vehicle signalling display device according to claim 12, further comprising:
   means for turning on a distinct arrangement of a number of said signalling lights for indicating different ranges of the speed of the vehicle.

17. A vehicle signalling display device to be mounted on an automotive vehicle in such way that signalling lights of said device are visible for drivers of following vehicles, comprising:
   a) timebase generator means for generating equal time intervals;
   b) counter means (IC1) for counting input pulses to said device during each of the equal time intervals; wherein, at the end of a time interval, a value that is present in said counter means corresponds to speed of the vehicle at the end of the time interval;
   c) memory means (IC3) for storing a value that is present in said counter means at the end of a time interval; wherein, a value that is stored in said memory means at the end of a time interval is used as reference value at the end of each of the equal time intervals;
   d) means for realizing that said reference value is equal to, less than or greater than a predetermined speed for determining different ranges of the speed of the vehicle;
   e) first comparator means (IC2) for comparing a value that is present in said counter means with said reference value at the end of each of the equal time intervals; wherein at the end of each of the equal time intervals said first comparator means generates at least one pulse in order to indicate that a value that is present in said counter means is equal to, less than or greater than said reference value;
   f) subtracter means (IC4, IC5) for subtracting, at the end of each of the equal time intervals, a value that is present in said counter means from said reference value or for subtracting said reference value from a value that is present in said counter means, in order to provide a remainder value which is equivalent to the magnitude of difference between said reference value and a value that is present in said counter means;
   g) second comparator means (IC6) for comparing a predetermined value with said remainder value; said second comparator means generates at least one pulse in order to indicate that said remainder value is equal to, less than or greater than said predetermined value;
   h) gate means (IC7-c) for generating an A pulse at the end of a time interval for indicating decrease, at least by said predetermined value, in a value that is present in said counter means at the end of the time interval relevant to said reference value; wherein said gate means generates said A pulse if, at the end of the time interval, said gate means is simultaneously fed (I) by an (IC7-a) pulse resulted from a comparison performed by said first comparator means indicating that the value that is present in said counter means at the end of the time interval is less than said reference value, and (II) by an (IC8-b) pulse resulted from a comparison performed by said second comparator means indicating that said remainder value is equal to or greater than said predetermined value; and i) said counter means is reset to zero at the end of each of the equal time intervals, in order to count said input pulses to said device during next time interval; wherein, at the end of a time interval, a value that is present in said counter means is stored in said memory means before resetting said counter means to zero if, at the end of the time interval, said (IC8-b) pulse is generated.

18. The vehicle signalling display device according to claim 17, further comprising means for turning on a distinct arrangement of a number of said signalling lights, in order to visualize said different ranges of the speed of the vehicle.

19. The vehicle signalling display device according to claim 18, further comprising means for flashing at least one light of said signalling lights if, at the end of a time interval, said A pulse is generated.

20. The vehicle signalling display device according to claim 17, wherein said input pulses are generated by speed sensor means of the vehicle and, in accordance with duration of the equal time intervals, said speed sensor means of the vehicle is adapted for a differential ratio and/or wheel size of the vehicle or the differential ratio and/or wheel size are adapted for said speed sensor means of the vehicle, or the differential ratio is adapted for the wheel size, or the wheel size is adapted for the differential ratio, in order to generate said input pulses to said device so that at the end of each of the equal time intervals, the number of pulses counted by said counter means is equal to the speed of the vehicle; wherein said adaptations result in standardization of said predetermined value for implementation of standardized operations of said signalling lights on vehicles of different make and model.

21. The vehicle signalling display device according to claim 17, further comprising a gate means (IC7-d) for generating an B pulse at the end of a time interval for indicating increase, at least by said predetermined value, in a value that is present in said counter means at the end of the time interval relevant to said reference value; wherein said gate means generates said B pulse if, at the end of the time interval, said gate means is simultaneously fed by (I) an (IC7-b) pulse resulted from a comparison performed by said first comparator means indicating that the value that is present in said counter means at the end of the time interval is greater than said reference value, and (II) by said (IC8-b) pulse.

22. A vehicle signalling display device to be mounted on an automotive vehicle in such way that signalling lights of said device are visible for drivers of following vehicles, comprising:

a) means for controlling said signalling lights in accordance with speed of the vehicle and regardless of operation and position of accelerator pedal of the vehicle;

b) means for turning on a distinct arrangement of a number of said signalling lights includes red, orange or amber, and green lights, in order to indicate different ranges of the speed of the vehicle;

c) means for flashing first and second red lights (LR3, LR4) of said signalling lights every time that the speed of the vehicle is reduced at least by a standardized value while brake is being applied on the vehicle and speed sensor means of the vehicle is generating input pulses to said device; wherein said red lights (LR3, LR4) flash faster and glow brighter as the magnitude of deceleration of the vehicle increases by braking;

d) means for turning on third red light (LR5) of said signalling lights steady without flashing and regardless of braking while the speed of the vehicle is less than a first predetermined speed;

e) means for turning on first and second orange lights (LO1, LO2) of said signalling lights while the speed of the vehicle is less than a second predetermined speed and greater than said first predetermined speed, and the brake is not being applied on the vehicle, in order to indicate low speed of the vehicle;

f) means for flashing said first and second orange lights (LO1, LO2) and third orange light (LO3) of said signalling lights every time that the speed of the vehicle is greater than said first predetermined speed and the speed is reduced at least by the standardized value while the brake is not being applied on the vehicle, in order to indicate the rate of deceleration of the vehicle without braking;

g) means for turning on first and second green lights (LG1, LG2) of said signalling lights only when the speed of the vehicle is grater than or equal to said second predetermined speed while the brake is not being applied on the vehicle, in order to indicate forward motion of the vehicle with constant; and h) means for flashing third green light (LG3) of said signalling lights when the speed of the vehicle is greater than said second predetermined speed and the speed is increased at least by the standardized value.

23. A vehicle signalling display device to be mounted on an automotive vehicle in such way that signalling lights of said device are visible for drivers of following vehicles, comprising:

a) pulse generator means (IC12, IC13) for generating a pulse at the end of equal time intervals;

b) delay pulse generator means for creating three pulses from each pulse generated by said pulse generator means: an decision pulse (IC9-a), immediately followed by an update pulse (IC9-b), immediately followed by an clear pulse (IC10-a, IC10-b);

c) counter means (IC1) for counting input pulses to said device during each of the equal time intervals; wherein, at the end of a time interval, a value that is present in said counter means is equal to speed of the vehicle at the end of the time interval;

d) memory means (IC3) for storing a value that is present in said counter means at the end of a time interval; wherein a value stored in said memory means is used as reference value at the end of each of the equal time intervals;

e) means for realizing that said reference value is equal to, less than or greater than a predetermined speed for determining different ranges of the speed of the vehicle;

f) first comparator means (IC2) for comparing a value that is present in said counter means with said reference value at the end of each of the equal time intervals; wherein, at the end of a time interval, outputs of said first comparator mean in conjunction with said decision pulse either result in generating an (IC7-a) pulse indicating decrease in a value that is present in said counter means at the end of the time interval relevant to said reference value, or result in generating an (IC7-b) pulse indicating increase in the value that is present in said counter means at the end of the time interval relevant to said reference value;

g) subtracter means (IC4, IC5) for subtracting, at the end of each of the equal time intervals, a value that is present in said counter means from said reference value, or for subtracting said reference value from a value that is present in said counter means in order to provide a remainder value which is equivalent to the magnitude of difference between said reference value and a value that is present in said counter means;

h) second comparator means (IC6) for comparing a predetermined value with said remainder value at the end of each of the equal time intervals; wherein, at the end of a time interval, said second comparator means results in generating an (IC8-b) pulse indicating that said remainder value is greater than said predetermined value or indicating that the speed of the vehicle is varied by said predetermined value;

i) first gate means (IC7-c), second gate means (IC7-d) and third gate means (IC9-d);

j) said first gate means is enabled to produce an A pulse at the end of a time interval in order to indicate decrease, at least by said predetermined value, in a value that is present in said counter means relevant to said reference value if, at the end of the time interval, said first gate means is simultaneously fed by said (IC7-a) pulse, and by said (IC8-b) pulse;

k) said second gate means is enabled to produce an B pulse at the end of a time interval for indicating increase, at least by said predetermined value, in a value that is present in said counter means relevant to said reference value if, at the end of the time interval, said second gate means is simultaneously fed by said (IC7-b) pulse and by said (IC8-b) pulse; and l) said third gate means updates said reference value to a value that is present in said counter means at the end of a time interval if, at the end of the time interval, said third gate means is simultaneously fed by said update pulse and by said (IC8-b) pulse; and m) said clear pulse resets said counter means to zero at the end of each of the equal time intervals, in order to count said input pulses to said device during next time interval.

24. The vehicle signalling display device according to claim 23, wherein said input pulses are generated by speed sensor means of the vehicle and, in accordance with duration of the equal time intervals, said speed sensor means of the vehicle is adapted for a differential ratio and/or wheel size of the vehicle or the differential ratio and/or wheel size are adapted for said speed sensor means of the vehicle, or the differential ratio is adapted for the wheel size, or the wheel size is adapted for the differential ratio, in order to generate said input pulses to said device so that at the end of each of the equal time intervals, the magnitude of the number of pulses counted by said counter means is equal to the magnitude of the speed of the vehicle; wherein said adaptations result in standardization of said predetermined value for implementation of standardized operations of said signalling lights on vehicles of different make and model.

25. The vehicle signalling display device according to claim 24, further comprising:

a) means for flashing first and second red lights (LR3, LR4) of said signalling lights every time said A pulse is generated while brake is being applied on the vehicle and said speed sensor means of the vehicle is generating pulses; wherein said red lights (LR3, LR4) flash faster and glow brighter as the magnitude of deceleration of the vehicle increases;

b) means for turning on third red light (LR5) of said signalling lights steady without flashing and regardless of braking while the speed of the vehicle is less than a first predetermined speed;

c) means for turning on first and second orange lights (LO1, LO2) of said signalling lights while the speed of the vehicle is less than a second predetermined speed and greater than said first predetermined speed, and the brake is not being applied on the vehicle, in order to indicate low speed of the vehicle;

d) means for flashing said first and second orange lights (LO1, LO2) and third orange light (LO3) of said signalling lights every time that said A pulse is generated while the brake is not being applied on the vehicle, in order to indicate the rate of deceleration of the vehicle without braking;

e) means for turning on first and second green lights (LG1, LG2) of said signalling lights only when the speed of the vehicle is grater than or equal to said second predetermined speed while the brake is not being applied on the vehicle, in order to indicate forward motion of the vehicle with constant speed; and f) means for flashing third green light (LG3) of said signalling lights if while the speed of the vehicle is greater than said second predetermined speed, said B pulse is generated.

26. The vehicle signalling display device according to claim 23, further comprising:

a) means for generating an amplifying version of said pulse (IC16-d) for generating an (r1) pulse;

b) means for generating an amplifying version of said B pulse (IC16-c) for generating an (G1) pulse;

c) said (r1) pulse initializing a time constant of a first timer means (IC19) for generating an (r2) pulse, and a time constant of second and third timer means (IC20) for generating an (O1) and an (O2) pulse; wherein said (O1) and (O2) pulses have equal length;

d) said (G1) pulse initializing a time constant of forth and fifth timer means (IC18) in order to generate an (G2) pulse and an (G6) pulse;

e) means for generating an (r3) pulse (IC14, IC15-b) for determining that the magnitude of said reference value is less than 8;

f) means for generating an (O3) pulse (IC14, IC15-a) for determining that the magnitude of said reference value is less than 32;

g) means for generating an (G3) pulse (IC14, IC15-d) for determining that the magnitude of said reference value is less than 96;

h) means for generating an (G5) pulse (IC14, IC15-c) for determining that the magnitude of said reference value is less than 128;

i) first, second, third, forth and fifth relays;

j) said forth relay having a normally closed contact for delivering a supply current (VCC4) from presence or fog light wire to said second and third relays for energizing a number of lights of said signalling lights only when said forth relay is not energized by an (r4) current branched out from brake light wire or from reverse motion light wire;

k) said third relay having a normally closed contact for delivering an energizing current (6) to first, second and third green lights (LG1, LG2, LG3) of said signalling lights only when said third relay is not energized by said (O1) or (O3) pulses;

l) said second relay having an output for providing a ground connection (9) for said green lights (LG1, LG2) for turning on said green lights (LG1, LG2) only when said second relay is not energized by said (O2) pulse or by an (Q3) transistor which is driven by said (G5) pulse; wherein said green lights (LG1, LG2) in lit condition indicate that the speed of the vehicle is between 31 km and 96 km/h;

m) said (G2) pulse energizing said first relay for closing a normally open contact of said first relay for providing a ground connection (3) for said green light (LG3) resulting in flashing on said green light (LG3) during the time that said (G2) pulse lasts, in order to indicate an increase in the speed of the vehicle at least by said predetermined value;

n) wherein an (G4) pulse (IC19) which is amplified and inverted version of said (G3) pulse energizes said first relay for providing said ground connection (3) for said green light (LG3), in order to keep said green light (LG3) lit while said green lights (LG1, LG2) remain lit indicating that the speed of the vehicle is between 95 and 128 km/h;

o) said (G6) pulse disabling said (G4) pulse (IC19) for de-energizing said first relay for disconnecting said ground connection (3) from said green light (LG3) during the time that said (G6) pulse lasts, resulting in flashing off said green light (LG3) for indicating an increase, at least by said predetermined value, in the speed of the vehicle that is between 95 kmh and 128 km/h;

p) said (G5) pulse driving said (Q3) transistor for energizing said second relay and disconnecting said ground connection (9) from said green lights (LG1, LG2), in order to keep only said green light (LG3) lit, indicating that the speed of the vehicle is greater than 127 km/h;

q) said (G6) pulse disabling said (G4) and (G5) pulses for de-energizing said first and second relays during the time that said (G6) pulse lasts, in order to disconnect said ground connection (3) of said first relay from said green light (LG3), and to connect said ground connection (9) of said second relay to said green lights (LG1, LG2) for flashing said green lights (LG1, LG2) and said green lights (LG3) on and off interchangeably indicating increase in the speed that is greater than 127 km/h at least by said predetermined value;

r) said (O1) pulse energizing said third relay for disconnecting said energizing current (6) from said green lights (LG1, LG2, LG3) and for closing a normally open contact of said third relay for delivering an energizing current (2) to first and second orange light (LO1, LO2) which are always grounded by a ground connection (1); wherein said (O1) pulse disables said (G4) pulse (IC19), if said (G3) pulse has already generated said (G4) pulse, for de-energizing said first relay in order to provide a ground connection (5) for third orange light (LO3); said (O2) pulse energizing said second relay for changing said ground connection (9) of said second relay to a connection to said supply current (VCC4) during the time that said (O2) pulse lasts, in order to disconnect said ground connection (9) from said green lights (LG1, LG2) and to provide an energizing current (9) for said orange light (LO3); wherein said (O1) and (O2) pulses result in flashing on said orange lights (LO1, LO2, LO3) and flashing off said green lights (LG1, LG2, LG3) during the time that said (O1) and (O2) pulses last;

s) said (O3) pulse driving an (Q4) transistor in order to energize said third relay for disconnecting said energizing current (6) from said green lights (LG1, LG2, LG3) and for connecting said energizing current (2) to said orange lights (LO1, LO2); resulting in turning on said orange lights (LO1, LO2) and turning off said green lights (LG1, LG2, LG3) while the speed of the vehicle is less than 32 km/h; wherein an (O4) pulse (IC16-a) which is an inverted version of said O3 pulse prevents said forth timer means from generating said (G2) pulse, in order to prevent said green light (LG3) from flashing when the speed of the vehicle is under 32 km/h and said B pulse is generated;

t) said current (r4) energizing said forth relay for disconnecting said supply current (VCC4) from said second and third relays when the brake is applied on the vehicle or when the vehicle is set for reverse motion, in order to keep said orange and green lights off when the brake is applied or when the vehicle is set for the reverse motion;

u) said (r2) pulse disabling said (G4) pulse, if said (G4) pulse is already generated, for energizing said first relay for providing said ground connection (3) for first and second red lights (LR3, LR4); wherein said red lights (LR3, LR4) flash on only if the brake is applied and said red lights (LR3, LR4) receive an energizing current (8) from the brake light wire;

v) said normally closed contact of said forth relay creating an (r5) pulse for disabling said (r2) pulse (IC19) when the brake is not applied and the speed of the vehicle is reduced at least by said predetermined value; and w) said fifth relay having an output for providing a ground connection (7) for third red light (LR5) only when said fifth relay is energized by an (Q5) transistor driven by said (r3) pulse when the speed of the vehicle is less than 8 km/h; said red light (LR5) receiving said energizing current (8) when the brake is applied on the vehicle, or receiving said energizing current (2) when the brake is not applied on the vehicle; wherein said red light (LR5) is turned on regardless of braking while the speed of the vehicle is less than 8 km/h which can be 0 km/h.

* * * * *

UNITED STATES PATENT AND TRADEMARK OFFICE
CERTIFICATE OF CORRECTION

PATENT NO.    : 6,211,780 B1
DATED         : April 3, 2001
INVENTOR(S)   : Kashefy It is certified that error appears in the above-identified patent and that said Letters Patent is hereby corrected as shown below:

<u>Title page,</u>
Item [76], Inventors, should read: -- Hamid R. Kashefy, 945 Richmond Road #802 Ottawa, ON K2B 8B9 Canada --

<u>Item [54] and Column 1, line 1,</u>
Please change the title of the invention as follows -- DYNAMIC TRAFFIC LIGHT VEHICLE SIGNALLING DISPLAY --

<u>Column 1,</u>
Please delete lines 51-52, which is "lave (1987) ran a number of cross-section regressions on state data."

<u>Column 14,</u>
Line 47, paragraph a) please delete "and after "the vehicle;"
Lines 48-51, please delete paragraph b).

<u>Column 15,</u>
Line 13, please change "a standardized value" to -- the predetermined value --.
Line 25, please change "said standardize value" to -- the predetermined value --.
Line 32, paragraph a) please delete "and" after "vehicle;".
Line 51, paragraph d) please insert -- ; and -- after "the vehicle".

<u>Column 16,</u>
Line 1, please delete "at least by a standardized value" before "while the brake is being applied".
Line 9, paragraph a) please insert -- and -- after "steady without flashing".
Line 39, paragraph c) please insert -- and -- after "the equal time intervals;".
Line 43, paragraph d) please insert -- and -- after "without flashing".

UNITED STATES PATENT AND TRADEMARK OFFICE
CERTIFICATE OF CORRECTION

PATENT NO. : 6,211,780 B1
DATED : April 3, 2001
INVENTOR(S) : Kashefy

It is certified that error appears in the above-identified patent and that said Letters Patent is hereby corrected as shown below:

Column 17,
Line 3 paragraph e) please insert -- and -- after "without flashing".
Line 8, please change "claim 12" to -- "claim 11" --.

Signed and Sealed this

Ninth Day of July, 2002

Attest:

JAMES E. ROGAN
Attesting Officer    Director of the United States Patent and Trademark Office